(12) United States Patent
McDaniel et al.

(10) Patent No.: US 6,867,278 B2
(45) Date of Patent: Mar. 15, 2005

(54) OLEFIN POLYMERS, METHOD OF MAKING, AND USE THEREOF

(75) Inventors: Max P. McDaniel, Bartlesville, OK (US); Elizabeth A. Benham, Spring, TX (US); Al R. Wolfe, Bartlesville, OK (US); Paul J. DesLauriers, Bartlesville, OK (US); Pamela L. Meager, Bartlesville, OK (US); William R. Coutant, Bartlesville, OK (US); David C. Rohlfing, Bartlesville, OK (US); Steven J. Secora, Bartlesville, OK (US)

(73) Assignee: Chevron Phillips Chemical Company, The Woodlands, TX (US)

( * ) Notice: Subject to any disclaimer, the term of this patent is extended or adjusted under 35 U.S.C. 154(b) by 73 days.

(21) Appl. No.: 10/373,648

(22) Filed: Feb. 24, 2003

(65) Prior Publication Data

US 2003/0199648 A1 Oct. 23, 2003

Related U.S. Application Data

(63) Continuation-in-part of application No. 09/640,868, filed on Aug. 18, 2000, now Pat. No. 6,525,148.

(51) Int. Cl.$^7$ .............................................. C08F 210/14
(52) U.S. Cl. ............................. 526/348.5; 526/348.2; 428/36.9
(58) Field of Search ........................... 526/348.2, 348.5; 428/36.9

(56) References Cited

U.S. PATENT DOCUMENTS

| | | | |
|---|---|---|---|
| 4,596,862 A | 6/1986 | McDaniel et al. | |
| 5,037,911 A | 8/1991 | McDaniel et al. | |
| 6,174,981 B1 * | 1/2001 | Bergmeister et al. | .... 526/348.2 |

* cited by examiner

*Primary Examiner*—Fred Teskin
(74) *Attorney, Agent, or Firm*—Womble Carlyle Sandridge & Rice PLLC

(57) ABSTRACT

The present invention is directed to homo-polymers and copolymers of mono-1-olefins, a method of making such polymers, and uses of such polymers. Polymers of the present invention are formed by contacting at least one mono-1-olefin having from 2 to about 20 carbon atoms per molecule and at least one mono-1-olefin co-monomer having from 2 to about 10 carbon atoms per molecule in a reaction zone under polymerization conditions in the presence of a hydrocarbon diluent, a catalyst system, and a cocatalyst. In another aspect of the present invention, ethylene copolymers are employed to produce PE-100 pipe. Further, these ethylene copolymers may be employed to produce PE-100 pipe having both small diameters and diameters in excess of 42 inches substantially without sagging or other gravitational deformation. Copolymers of ethylene and 1-hexene are disclosed which are used to produce PE-100 pipe.

22 Claims, 6 Drawing Sheets

Figure 3. Dynamic Melt Viscosity vs. Frequency Measured at 190 °C

US 6,867,278 B2

OLEFIN POLYMERS, METHOD OF MAKING, AND USE THEREOF

CROSS-REFERENCE TO RELATED APPLICATION

This application is a continuation-in-part of U.S. patent application Ser. No. 09/640,868, now U.S. Pat. No. 6,525,148, filed Aug. 18, 2000.

FIELD OF THE INVENTION

The present invention relates to polyolefin compositions, methods for producing polyolefin compositions, articles of manufacture using polyolefin compositions, and processes for producing articles of manufacture using polyolefin compositions. More particularly, the present invention relates to mono-1-olefin homo- and copolymer compositions, methods for producing such compositions, articles of manufacture using such compositions, and processes for producing articles of manufacture using such compositions.

BACKGROUND OF THE INVENTION

Presently, various resins are used to produce numerous types and styles of pipe. For example, polyethylene resins have long been used to produce high stiffness pipe used in water, gas, and other fluid transport applications. Polyethylene pipe classified as PE-100, MRS 10, or ASTM D3350 typical cell classification 345566C is especially desirable for use under conditions requiring higher pressure ratings. The higher pressure ratings are due in part to the pipe's higher stiffness. To obtain a PE-100 classification, PE-100 pipe is required to meet certain standards specifying stiffness, resistance to chemical attack, and brittleness, as expressed as rapid crack propagation under cold temperature environments or applications. Further, such pipe must meet a deformation standard which is determined under pressure at elevated temperatures.

Although certain PE-100 classified polyethylene resins are commercially available, these polyethylene resins are the "bimodal" type. Bimodal polyethylene resins are made in reactor systems involving two or more reaction zones or by blending two or more distinct polymers. Unfortunately, despite the excellent toughness of these resins, bimodal resins are found to be deficient when pipe is formed by extrusion under certain conditions. Typically, bimodal resins perform adequately in the production of standard, small diameter pipe, that is, pipe having diameters between 1–12 inches. However, when forming large diameter and/or thick-walled pipe, the bimodal resins begin to "sag" or "slump" as the newly formed pipe emerges from the extrusion die. Apparently, the still semi-molten polymer does not have sufficient melt strength during the short time before the pipe cools and hardens to resist deformation due to gravitational force. This phenomenon causes an inconsistency in the pipe which results in the lower portion of the pipe to be thicker and heavier than the upper portion. A pipe manufacturer can compensate to some degree by adjusting the die to form pipe that is "out of round" as it exits the die, so that it subsequently sags back into a better balance. However, such adjustments are complicated, and the degree to which the pipe manufacturer can compensate for "sag" is limited. As a result, currently available PE-100 classified resins are typically used only to produce small diameter pipe. Accordingly, there is a need for a PE-100 classified resin which can be employed to produce both small and large diameter PE-100 pipe.

During the production of high density olefin polymers or resins, such as high density polyethylene, conventional supported chromium catalyst systems may be employed. However, as originally commercialized, use of these conventional supported chromium catalyst systems are limited. Typically, the conventional supported chromium catalyst systems are used in solution polymerization processes. A more economical route to produce many grades of commercial olefin polymers employs a slurry process. In the slurry process, the polymerization reaction employs one or more monomers in the presence of a diluent and the catalyst system. Beneficially, the polymerization reaction occurs in the slurry process at a temperature which is sufficiently low to permit the resulting polymer to be largely insoluble in the diluent. However, as explained below, conventional supported chromium catalyst systems are undesirable for use in a slurry process to produce a PE-100 classified resin. Accordingly, there is a need for a supported chromium catalyst system which may be employed in a slurry process to produce a PE-100 classified resin.

Currently, mono-1-olefins, such as ethylene, are polymerized with catalyst systems employing transition metals such as titanium, vanadium, chromium, or other metals, either unsupported or on a support, such as alumina, silica, aluminophosphate, titania, zirconia, magnesia, and other refractory metals. Such catalyst systems are used to form homopolymers of ethylene. Additionally, comonomers such as propylene, 1-butene, 1-hexene, or other higher mono-1-olefins may be copolymerized with ethylene to provide resins tailored to specific end uses.

Polymers having broad molecular weight distributions and improved physical properties, such as environmental stress crack resistance (ESCR), slow crack growth resistance (PENT), and impact resistance, can be formed by employing chromium catalyst systems containing aluminophosphate supports, to include alumina ($Al_2O_3$). For example, polymers having a molecular weight distribution ($M_w/M_n$) of up to 30 can be obtained with aluminophosphate supported catalyst systems. Aluminophosphate supports are characterized by the amount of phosphate in the support, or more precisely, by the phosphorous to aluminum molar ratio (P/Al) of the composition. The P/Al molar ratio can vary from 0, e.g. alumina, to 1 for stoichiometric aluminum phosphate ($AlPO_4$). At a P/Al molar ratio of 1, a crystalline solid of very little surface area and minimal pore volume is obtained. As a result, the activity of catalyst systems employing an aluminophosphate support having a P/Al ratio of 1 is minimal. Additionally, catalyst systems employing chromium supported on alumina also have a very low activity. Therefore, in practice, the commercially preferred P/Al molar ratio of phosphorus to aluminum in chromium/aluminophosphate catalyst systems is 0.7 to 0.9. See *The Structure of Coprecipitated Aluminophosphate Catalyst Supports*; T. T. P. Cheung, K. W. Willcox, M. P. McDaniel, and M. M. Johnson; *Journal of Catalysis*, Vol.102, p.10–20 (1986).

Below a P/Al molar ratio of 0.3, the activity is considered too low to be practical. Yet, catalyst systems employing aluminophosphate supports having such lower P/Al molar ratios produce polymers which desirably have the broadest molecular weight distributions, and thus, the highest ESCR and impact resistance values. Another disadvantage of conventional chromium/aluminophosphate catalyst systems is that they incorporate certain comonomers, such as 1-hexene, very poorly. In conventional processes, 1-hexene can kill the activity of chromium/aluminophosphate catalyst systems. Thus, while conventional chromium/aluminophosphate catalyst systems are excellent for producing very high density blow molding resins, such catalyst systems have not gained acceptance for the commercial production of lower density copolymers which are used to produce film and pipe.

Despite existing catalyst systems, methods, and resins, a need exists for improved catalyst systems, methods, and resins for producing PE-100 pipe. It is to the provision of catalyst systems, methods, and resins that meet these needs that the invention is primarily directed.

This invention also relates to polyolefin compositions, methods for producing polyolefin compositions, and to processes for using polyolefin compositions for producing pipe. More specifically this invention relates to the production of PE-100 classification polyethylene pipe and the resin used to make that pipe.

This invention relates to the polymerization and copolymerization of a mono-1-olefin, such as ethylene, with a higher alpha-olefin comonomer, such as 1-hexene.

This invention further relates to producing cost-effective ethylene polymers and copolymers of exceptional toughness, which can be processed into large diameter pipe without the distortion caused by the commonly observed "sag" or "slumping" phenomenon during extrusion.

The present invention describes a new type of PE-100 polyethylene resin which does not exhibit this slumping behavior, and which can, for the first time, be used to produce very large diameter pipe without problem. The present invention also describes the unique catalyst system that is used to produce this polymer in a single reaction zone, which means that the resin can be manufactured more efficiently that the common "bimodal" type resins.

SUMMARY OF THE INVENTION

The present invention is directed to homo-polymers and copolymers of mono-1-olefins, a method of making such polymers, and uses of such polymers. Polymers of the present invention are formed by contacting at least one mono-1-olefin having from 2 to about 20 carbon atoms per molecule and at least one mono-1-olefin co-monomer having from 2 to about 10 carbon atoms per molecule in a reaction zone under polymerization conditions in the presence of a hydrocarbon diluent, a catalyst system, and a cocatalyst. The catalyst system of the present invention comprises a chromium source on an aluminophosphate support which has a phosphorous to aluminum mole ratio of less than about 0.3. Further, the catalyst system is treated with less than about 7 weight percent fluoride based on the weight of the support and is calcined. Cocatalyst are selected from trialkylboron compounds, triarylboron compounds, alkylaluminum compounds, and combinations thereof.

In another aspect of the present invention, ethylene copolymers are employed to produce PE-100 pipe. These copolymers are formed by contacting ethylene with at least one mono-1-olefin comonomer having from 2 to about 10 carbon atoms per molecule in a reaction zone under polymerization conditions in the presence of a hydrocarbon diluent, a catalyst system, and a cocatalyst. Additionally, the comonomers may be selected from mono-1-olefins having 4 to 10 carbon atoms, such as, 1-hexene, 1-butene, 4-methyl-1-pentene, 1-octene, and 1-decence. Such inventive ethylene copolymers have a molecular weight distribution ($M_w/M_n$) greater than about 50 and a substantially constant branch distribution profile at molecular weights greater than about $1 \times 10^4$. Further, these ethylene copolymers may be employed to produce PE-100 pipe having both small diameters and diameters in excess of 42 inches substantially without sagging or other gravitational deformation. The ethylene copolymers of the present invention have a high load melt index (HLMI) within a range of about 0.5 to about 10 g/10 minutes, a density within a range of about 0.945 to about 0.955 g/cc, a molecular weight distribution ($M_w/M_n$) greater than about 50, a PENT slow crack growth resistance value of greater than about 1000 hours, and a branch profile of greater than about 1 branch/1000 carbons at 1 million molecular weight.

BRIEF DESCRIPTION OF THE DRAWINGS

The following is a brief description of the Figures.

DETAILED DESCRIPTION OF THE INVENTION

Figure 1:
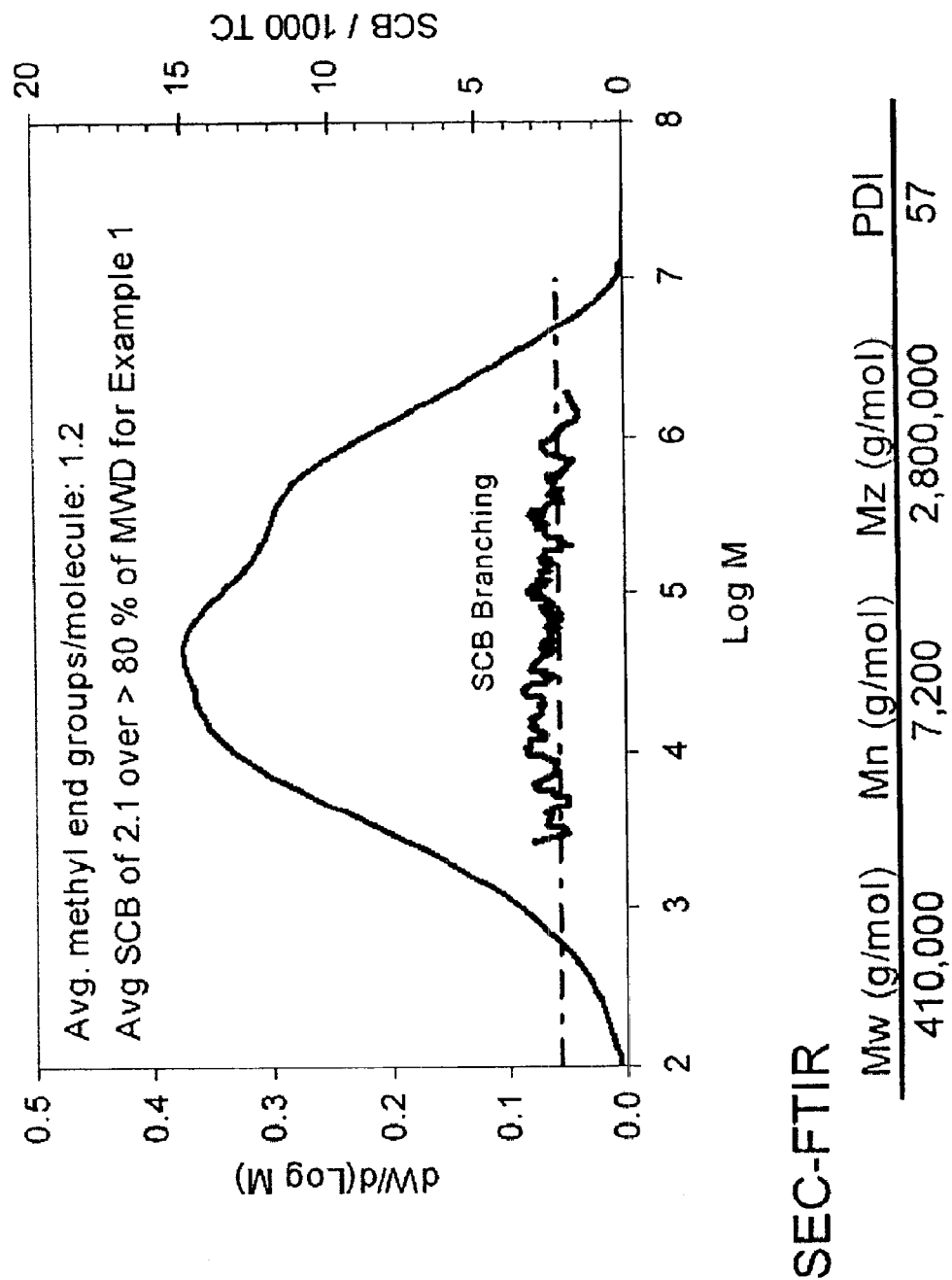
FIG. 1 is a graph illustrating the substantially constant short chain branch distribution across the molecular weight distribution of the PE-100 polyethylene copolymer made in accordance with the present invention in Example 1.

The present invention is directed to homo-polymers and copolymers of mono-1-olefins, a method of making such polymers, and uses of such polymers. Polymers of the present invention are formed by contacting at least one mono-1-olefin having from 2 to about 20 carbon atoms per molecule and at least one mono-1-olefin comonomer having from 2 to about 10 carbon atoms per molecule in a reaction zone under polymerization conditions in the presence of a hydrocarbon diluent, a catalyst system, and a cocatalyst. The catalyst system of the present invention comprises a chromium source on an aluminophosphate support which has a phosphorous to aluminum mole ratio of less than about 0.3. Further, the catalyst system is treated with less than about 7 weight percent fluoride based on the weight of the support and is calcined. Cocatalyst are selected from trialkylboron compounds, triarylboron compounds, alkylaluminum compounds, and combinations thereof.

In another aspect of the present invention, ethylene copolymers are employed to produce PE-100 pipe. These copolymers are formed by contacting ethylene with at least one mono-1-olefin comonomer having from 2 to about 10 carbon atoms per molecule in a reaction zone under polymerization conditions in the presence of a hydrocarbon diluent, a catalyst system, and a cocatalyst. Additionally, the comonomers may be selected from mono-1-olefins having 4 to 10 carbon atoms, such as, 1-hexene, 1-butene, 4-methyl-1-pentene, 1-octene, and 1-decence. Such inventive ethylene copolymers have a molecular weight distribution ($M_w/M_n$) greater than about 50 and a substantially constant branch distribution profile at molecular weights greater than about $1 \times 10^4$. Further, these ethylene copolymers may be employed to produce PE-100 pipe having both small diameters and diameters in excess of 42 inches substantially without sagging or other gravitational deformation. The ethylene copolymers of the present invention have a high load melt index (HLMI) within a range of about 0.5 to about 10 g/10 minutes, a density within a range of about 0.945 to about 0.955 g/cc, a molecular weight distribution ($M_w/M_n$) greater than about 50, a PENT slow crack growth resistance value of greater than about 1000 hours, and a branch profile of greater than about 1 branch/1000 carbons at 1 million molecular weight.

In accordance with yet another embodiment of this invention, herein is provided a composition comprising a copolymer of ethylene and 1-hexene, wherein said copolymer has a high load melt index (HLMI) within a range of about 0.5 to about 10 g/10 minutes, a density within a range of about 0.947 to about 0.953 g/cc, a molecular weight distribution ($M_w/M_n$) of greater than about 80, a PENT slow crack growth resistance value of greater than about 1000 hours, and a branch profile of greater than about 1 branch/ 1000 carbons at 1 million molecular weight. Further, in another aspect of the present invention, the inventive ethylene copolymers have a high load melt index (HLMI) within a range of about 0.5 to about 10 g/10 minutes, a density within a range of about 0.945 to about 0.955 g/cc, a molecular weight distribution ($M_w/M_n$) greater than about 40, a PENT, slow crack growth resistance, value of greater than about 1000 hours, and a branch profile of greater than about 1 branch/1000 carbons at 1 million molecular weight.

Polymers of the present invention may be formed or extruded into articles of manufacture, including pipe, by any method known in the art. Typically, pipe is formed by extruding polymers of the present invention in a molten state through a die to form the pipe, and the pipe is subsequently cooled to fix the shape of the pipe. Additionally, pipe extrusion is discussed in U.S. Pat. No. 5,028,376, which is incorporated herein by reference.

Catalyst Systems

As used in this disclosure, the term "support" refers to a carrier for one or more catalytic components. In accordance with the present invention, the support may comprise materials and compositions which are inert with respect to polymerization reactions. Further, the support may comprise materials or compositions which contribute to catalytic activity and selectivity of polymerization reactions. In addition, other materials or components which do not adversely affect the catalyst system and/or the polymerization reaction of the present invention or are present to produce some unrelated results or polymer properties may be present in the support as well.

Generally, the aluminophosphate support of the present invention can be prepared by any method known to one skilled in the art, such as, for example, use of a cogel. Examples of preparations which may be employed in the present invention are described in U.S. Pat. Nos. 4,364,842; 4,444,965; 4,364,855; 4,504,638; 4,364,854; 4,444,964; 4,444,962; 4,444,966; and 4,397,765, all of which are incorporated herein their entirety by reference. When the aluminophosphate support is prepared by cogellation, a hydrogel can be produced by contacting an aluminum compound and phosphorus compound as an aqueous solution. To assist in forming the solution of the aluminum and phosphorus compounds, the mixture can be warmed to a temperature sufficient to dissolve the compounds, for example, to at least about 40° C. (104° F.). Base is added to bring the solution to near neutral pH, causing precipitation of the aluminophosphate. By varying the amounts of aluminum and phosphorus added, the desired P/Al molar ratio can be achieved. Also, alcoholic or other organic solutions may be employed, such as for example, hydrolyzing aluminum alkoxides by adding aqueous phosphate solutions.

Further, the aluminophosphate support employed in the present invention may be formed by contacting alumina with an inorganic or organic phosphate compound in an aqueous or organic solution. Thus, the phosphate, such as phosphoric acid, can be impregnated onto a preformed alumina of high porosity. Optionally thereafter, the impregnated alumina is dried. Aluminophosphate supports prepared according to this method are called "phosphated aluminas".

When a phosphated alumina is employed as the support, the alumina optionally may be calcined prior to treatment with phosphate. Sometimes alumina takes the form of AlOOH, such as boehmite or other hydrates. Calcining the alumina converts the hydrated alumina support either partially or in total into aluminum oxide, such as gamma-alumina, $Al_2O_3$. The alumina may be calcined in an atmosphere of an inert gas, such as air or nitrogen, or in a vacuum. Calcining may be conducted at temperatures between about 100° C. to about 800° C. In one aspect of the present invention, the alumina is calcined before the phosphate treatment at temperatures between about 500° C. to about 700° C.

Aluminophosphate supports having a P/Al molar ratio below about 0.7 are employed in the present invention. Further, aluminophosphate supports employed in the present invention may have a P/Al molar ratio below about 0.3, and generally, the P/Al molar ratio is within a range from about 0.03 to about 0.28. In another aspect of the present invention, the P/Al molar ratio of the aluminophosphate support is within a range from about 0.05 to about 0.28. Yet, in another aspect of the present invention, the P/Al molar ratio of the aluminophosphate support is within a range from about 0.04 to about 0.20. Still, in another aspect of the present invention, favorable catalyst system activity, resin properties, and pipe properties can be achieved with a P/Al molar ratio of the aluminophosphate support within a range from about 0.05 to about 0.15.

Although not required, the aluminophosphate can be calcined as well prior to use or inclusion in the catalyst system of the present invention. The aluminophosphate can be calcined at a temperature within a range from about 200° C. (392° F.) to about to about 900° C., although temperatures up to about 1000° C. (1832° F.) may be employed. In another aspect of the present invention, the aluminophosphate can be calcined at a temperature within a range from about 400° C. to about 800° C. (1472° F.). Yet, in another aspect of the present invention, the aluminophosphate can be calcined at a temperature within a range from about 550° C. to about 700° C. (1292° F.) for 3 to 4 hours.

The chromium component of the catalyst system can be combined with the support component in any manner known in the art, such as by cogellation as described above, or by post-impregnation in which a chromium compound such as chromium (VI) trioxide, chromium (III) acetate, chromium (III) nitrate, and mixtures thereof can be dissolved into aqueous or alcoholic or other organic solvents. Other chromium compounds known in the art also can be employed. The chromium solution then is impregnated into or onto the aluminophosphate support and evaporated to dryness. The chromium component of the catalyst system comprises from about 0.1 to about 5 weight percent chromium based on the weight of the support. In another aspect of the present invention, the chromium component comprises from about 0.8 to about 3 weight percent based on the weight of the support. Yet, in another aspect of the present invention, the chromium component comprises about 0.8 to about 1.5 weight percent chromium based on the weight of the support. Still, in another aspect of the present invention, the chromium component comprises about 1 to about 2.5 weight percent chromium based on the weight of the support.

Additionally, a fluoriding agent is employed in the catalyst system of the present invention. Any organic or inorganic fluoriding agent which can form a surface fluoride with a support can be used in the invention. Suitable fluoriding agents include, but are not limited to, hydrofluoric acid (HF), ammonium fluoride ($NH_4F$), ammonium bifluoride ($NH_4HF_2$), ammonium fluoroborate ($NH_4BF_4$), ammonium silicofluoride (($NH_4)_2SiF_6$), ammonium fluorophosphate ($NH_4PF_6$), ammonium hexafluorotitanate (($NH_4)_2TiF_6$), ammonium hexafluorozirconate, (($NH_4)_2ZrF_6$), and combinations thereof. Due to ease of use and availability, ammonium bifluoride may be employed as the fluoriding agent. The amount of fluoride deposited into or onto the support is generally within a range from about 0.3 to about 7 weight percent based on the weight of the support. In another aspect of the present invention, the amount of fluoride present in the catalyst system of the present invention is from about 0.7 to about 4 weight percent based on the weight of the support. Yet, in another aspect of the present invention, the amount of fluoride present in the catalyst system of the present invention is from about 1.3 to about 3.5 weight percent based on the weight of the support.

Generally, the fluoriding agent can be added to the support by forming a slurry of the support in a solution of the fluoriding agent and a suitable solvent, such as alcohol or water. Examples of solvents which may be employed in the present invention include, but are not limited to, alcohols containing from about one to about three carbon atom molecules due to their volatility and low surface tension. A suitable amount of the solution can be utilized to provide the desired concentration of fluoride on or in the support after drying. Drying can be effected by any method known in the art. For example, drying can be completed by suction filtration followed by evaporation, drying under a vacuum, by spray drying, flash drying, and the like. Optionally, the support may be treated with the fluoriding agent during calcination. Any fluoriding agent capable of contacting the support during calcination can be used. In addition to the fluoriding agents as described above, organic fluoriding agents with high volatility may be employed. Examples of organic fluoriding agents with high volatility include, but are not limited to, freons, perfluorohexane, perfluorobenzene, fluoromethane, trifluoroethanol, and mixtures thereof. Further, such high volatility fluoriding agents may be employed in any combination with the fluoriding agents described above. Gaseous hydrogen fluoride or fluorine itself may be employed as well. One convenient method of contacting the support is to vaporize the fluoriding agent into a gas stream which can be used to fluidize the support during calcination.

The catalyst system, either before, during, or after the fluoriding treatment, is activated by calcination by any method(s) known to one in the art to produce a calcined catalyst system. In accordance with the present invention, the catalyst system may be calcined in an oxygen-containing ambient in any manner conventionally used in the art. For example, the catalyst system can be calcined in any dry oxidizing gas, such as oxygen, nitrous oxide, air, mixtures of oxygen other inert gas or gases, and the like. Because of economy, air or dry air may be employed as the oxygen-containing ambient. The calcination temperature generally employed is within a range from about 400° C. (752° F.) to about 800° C. In another aspect of the present invention, the calcination temperature is within a range from about 500° C. (932° F.) to about 700° C. (1292° F.). Yet, in another aspect of the present invention, the calcination temperature is within a range from about 550° C. (1022° F.) to about 650° C. (1202° F.).

The time period for conducting the calcination of the fluoridized catalyst system is generally within a range from about 1 minute to about 100 hours. In another aspect of the present invention, calcination of the fluoridized catalyst system is conducted from about 1 hour to about 30 hours. Yet, in another aspect of the present invention, calcination of the fluoridized catalyst system is conducted from about 3 hours to about 10 hours. Under these calcination conditions, at least a substantial portion of any chromium in a lower valence state is converted to a hexavalent form.

After calcination, the catalyst system optionally can be cooled and subjected to at least a partial reduction of hexavalent chromium which may be present to a lower valence state. In one aspect of the present invention, a substantial portion of the chromium is in the divalent state (Cr(II)) after the reduction process.

Any compound capable of reducing chromium(VI) to a lower valence state may be employed as a reducing agent. For example, carbon monoxide may be employed as the reducing agent due to its ready availability, ease of use, safety, and lack of hydrogen, which can produce moisture as a by-product. Reducing agents can be employed at temperatures within a range from about 150° C. (752° F.) to about 600° C. (1112° F.). In another aspect of the present invention, the temperature is within a range from about 200° C. (392° F.) to about 500° C. (932° F.). Yet, in another aspect of the present invention, the temperature is within a range from about 300° C. (572° F.) to about 400° C. (752° F.). The partial pressure of the reducing gas in the reduction process can be varied from sub-atmospheric pressures to relatively high pressures, but the simplest reducing process is to utilize a dilute solution of a pure reducing agent at about atmospheric pressure. Usually, a solution of about 10% by volume of carbon monoxide in an inert ambient, such as, for example, nitrogen and/or argon, can be used.

The reduction time can vary from a few minutes to several hours or more. The extent of reduction can be followed by visual inspection of the catalyst system color. The color of the initial oxidizing gas activated catalyst system is generally orange, indicating the presence of hexavalent chromium. The color of the reduced catalyst system is typically blue, indicating that all, or substantially all, of the initial hexavalent chromium has been reduced to lower oxidation states, generally to the divalent state.

After reduction, the catalyst system can be cooled to about room temperature, e.g., about 25° C. (77° F.), in an inert atmosphere, such as argon or nitrogen, to flush out the reducing agent. After the flushing treatment, the catalyst system is kept away from contact with either a reducing agent or an oxidizing agent.

In order to achieve the desired resultant effects on the resin product, or polymer, it is beneficial for the catalyst system to have relatively high pore volume. For example, after calcination, the catalyst system should have a pore volume of at least about 0.5 cc/g, as measured by nitrogen sorption. In another aspect of the present invention, the pore volume of the catalyst system is at least about 1.0 cc/g. Yet, in another aspect of the present invention, the pore volume of the catalyst system is at least about 1.2 cc/g. Additionally, the catalyst system after calcination should have a high surface area, as measured by the BET method, usually within a range of from about 150 m²/g to about 1000 m²/g. In another aspect of the present invention, the surface area of the catalyst system is within a range from about 200 m²/g to about 500 m²/g. Yet, in another aspect of the present invention, the surface area of the catalyst system is within a range from about 250 m²/g to about 450 m²/g.

Cocatalysts

As indicated above, a cocatalyst is employed with the supported chromium catalyst system of the present invention. Examples of cocatalysts useful in the present invention include, but are not limited to, one or more trialkylboron compounds, one or more triarylboron compounds, one or more alkylaluminum compounds, and combinations thereof.

Trialkylboron compounds are effective agents to improve polymer properties and increase catalyst activity during polymerization. Examples of suitable trialkylboron compounds include those containing from 1 to about 12 carbon atoms per alkyl group. Another aspect of the present invention employs trialkylboron compounds containing from about 2 to 5 carbon atoms per alkyl group. Trialkylboron compounds which may be employed in the present invention include, but are not limited to, trimethylborane, triethylborane (TEB), tri-n-butyl borane, tributylborane, tripropylborane, and combinations thereof.

Triarylboron compounds also may be employed as a cocatalyst in the present invention. Examples of suitable triarylboron compounds include, but are not limited to, triphenylborane and tribenzylborane.

Examples of suitable alkylaluminum compounds include, but are not limited to, those with the general formula (I):

$$AlR'_nX_{3-n} \qquad (I)$$

In formula (I), X is a hydride, alkoxide, siloxane, or halide; R' is a hydrocarbyl radical having from about 1 to 12 carbon atoms per radical group; and n is an integer from 1 to 3. Such aluminum compounds include, but are not limited to, trimethylaluminum, triethylaluminum (TEA), diethylaluminum chloride (DEAC), diethylaluminum ethoxide (DEALE), tributylaluminum, and combinations thereof. In one aspect of the present invention, the trialkylaluminum compounds employed are trimethylaluminum, triethylaluminum, tributylaluminum, and combinations thereof. Aluminoxanes are alkylaluminum compounds which may also be employed as cocatalysts in the present invention. Examples of aluminoxanes include, but are not limited to, methylaluminoxane, propylaluminoxane, n-butylaluminoxane, and isobutylaluminoxane.

Also, as indicated above, alkylsiloxyaluminum compounds are identified as alkylaluminum compounds which may be employed as a cocatalyst in the present invention. In addition to the alkylsiloxyaluminum compounds included within the scope of formula (I) above, other suitable alkylsiloxyaluminum compounds include, but are not limited to, those with the general formula (II):

$$R_3SiOAlR_2 \qquad (II)$$

In formula (II), the R groups can be the same or different and have in the range of from about 1 to 12 carbon atoms per alkyl group. Alkylsiloxyaluminum compounds include, but are not limited to, triethylsiloxyaluminum diethyl, trimethylsiloxyaluminum diethyl, tripropylsiloxyaluminum dimethyl, and combinations thereof. Presently preferred trialkylsiloxyaluminum compounds include, but are not limited to, triethylsiloxyaluminum diethyl.

The total amount of boron and/or aluminum cocatalyst compound(s) used is generally within a range between about 0.1 to about 100 parts by weight per 1000 parts by weight of the calcined catalyst system fed to the polymerization reactor. In a continuous particle form process using a single loop reactor, for example, it is convenient to introduce the cocatalyst as a separate stream into the reactor, either continuously or in pulses, as a dilute solution in an inert hydrocarbon, for example 0.1 weight percent in isobutane. The concentration of the cocatalyst also can be expressed in parts per million (ppm) based on the diluent used in the polymerization reactor. The concentration of the cocatalyst compound(s) usually is within a range between about 0.1 ppm to about 20 ppm, based on the amount of diluent charged or weight of the diluent. In one aspect, the concentration of cocatalyst compound(s) is within a range between about 0.5 ppm to about 15 ppm. In another aspect, the concentration of cocatalyst compound is within a range between about 0.5 ppm to about 10 ppm. Yet, in another aspect, the concentration of cocatalyst compound is within a range between bout 0.5 ppm to about 7 ppm. Still, in another aspect, the concentration of cocatalyst compound is within a range between about 2 ppm to about 12 ppm.

Reactants

Catalyst systems of the present invention can be used to polymerize at least one mono-1-olefin containing from about 2 to about 20 carbon atoms per molecule. Suitable mono-1-olefins include, but are not limited to, ethylene, propylene, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof. When the desired polymerization product is a homopolymer, ethylene or propylene should be employed as the monomer. If the reaction product is a copolymer, at least one mono-1-olefin is polymerized with a different mono-1-olefin comonomer. In one aspect of the present invention, the comonomer comprises from about 3 to about 10 carbon atoms per molecule. In another aspect of the present invention, the comonomer comprises from about 3 to about 8 carbon atoms per molecule.

In a further aspect of the present invention, catalyst systems of the present invention are particularly beneficial when employed to polymerize ethylene with one or more mono-1-olefin comonomers containing from about 2 to about 20 carbon atoms per molecule. Suitable mono-1-olefin comonomers include, but are not limited to, 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene, and mixtures thereof. Polymer product toughness can be maximized by employing 1-hexene as the comonomer.

Generally, a comonomer can be added to the polymerization reactor, or reactor zone, in an amount within a range from about 1 to about 20 weight percent based on the weight of the monomer. In another aspect of the invention, the comonomer generally can be added within a range from about 7 to about 18 weight percent based on the weight of the monomer. Yet, in another aspect of the invention, the comonomer generally is present in the reaction zone within a range from about 10 to about 16 weight percent based on the weight of the monomer. The amount of comonomer may be tailored to produce a copolymer having the most desired physical properties.

When ethylene polymers are desired, the comonomer can be added to the polymerization reactor, or reactor zone, in an amount within a range of from about 0.1 to about 20 weight percent of the hydrocarbon diluent in order to produce a polymer having the most desired physical properties. Alternatively, the comonomer can be added within a range from about 0.3 to about 10 weight percent based on the weight of the diluent. Yet, the comonomer present in the reaction zone may be within a range from about 0.7 to about 5.0 weight percent based on the weight of the diluent. By varying the ethylene to comonomer ratio in the reactor, the density of the polymer can be controlled. Also, the molecular weight of the polymer can be controlled by various means known in the art, such as, for example, adjusting the temperature, introducing or varying the amount of hydrogen present, or varying the catalyst system compounds.

Polymerization

Polymerization can be carried out in any manner known to one skilled in the art, such as gas phase, solution, multi-reactor, or slurry polymerization conditions, to effect polymerization. A stirred reactor can be utilized for a batch process, or the reaction can be carried out continuously in a loop reactor, such as a single loop reactor, or in a continuous stirred reactor. A polymerization technique readily employable in the present invention is that which is referred to as particle-form, or slurry, polymerization conditions using a loop reactor. Under such conditions, the temperature is kept below the temperature at which a polymer swells or goes into solution. Slurry polymerization processes can be much easier to operate and maintain than other polymerization processes, in that a polymer product produced by a slurry process can be recovered much more easily. Such polymerization techniques are well-known in the art and are disclosed, for instance, in Norwood, U.S. Pat. No. 3,248,179, which is incorporated herein by reference. For example, two polymerization techniques which may be employed in the present invention for the slurry process are those employing a loop reactor of the type disclosed in Norwood and those utilizing a plurality of stirred reactors either in series, parallel, or combinations thereof wherein the reaction conditions can be different in the different reactors.

The slurry process generally is carried out in an inert diluent (medium), such as, for example, a paraffin, cycloparaffin, and/or aromatic hydrocarbon. An inert diluent which may be employed in the present invention is an alkane having less that about 12 carbon atoms per molecule, for optimal reactor operation and polymer product. Exemplary diluents include, but are not limited to, propane, n-butane, isobutane, n-pentane, 2-methylbutane (isopentane), and mixtures thereof. Isobutane is an economically efficient diluent due to low cost and ease of use. Examples of the use of isobutane as a diluent in slurry polymerization processes can be found in U.S. Pat. Nos. 4,421,341; 4,501,885; 4,613,484; 4,737,280; and 5,597,892, all of which are incorporated herein in their entirety by reference. These techniques provide efficient polymerization of ethylene, for example, ethylene and a different mono-1-olefin, such as an alpha-1-olefin, or propylene.

The temperature of the polymerization reactor, or reaction zone, is usually within a range from about 80° C. to about 110° C. (212° F.), although higher or lower temperatures can be used. In another aspect of the present invention, the temperature is within a range from about 90° C. (194° F.) to about 107° C. (225° F.). Yet, in another aspect of the present invention, the temperature is within a range from about 95° C. (203° F.) to about 105° C. (221° F.).

Pressures in the slurry process can vary from about 100 psia to about 1000 psia (0.76–7.6 MPa). In another aspect of the present invention, the pressures can very in a range from about 200 psia to about 700 psia. Yet, in another aspect of the present invention, the reaction zone is maintained at a pressure within a range from about 300 psia to about 600 psia for optimal reactor operating parameters and resultant polymer product.

The catalyst system is kept in suspension and is contacted with the monomer and comonomer(s) at a sufficient pressure to maintain the medium and at least a portion of the monomer and comonomer(s) in the liquid phase. The medium and temperature are thus selected so that the polymer or copolymer is produced as solid particles and is recovered in that form. Catalyst system concentrations in the reactor can be such that the catalyst system content ranges from about 0.0005 to about 1 weight percent based on the weight of the reactor contents. During the production of ethylene polymers, catalyst system concentrations in the reactor can be such that the catalyst system content ranges from about 0.0005 to about 0.05 weight percent based on the weight of the reactor contents.

Polymer Description

Polymers produced in accordance with the present invention can be homopolymers of at least one mono-1-olefin and copolymers of mono-1-olefins. For example, such polymers include copolymers of ethylene and at least one mono-1-olefin of 4–10 carbons, such as 1-hexene, 1-butene, 4-methyl-1-pentene, 1-octene, and 1-decene. Further, polymers produced according to the present invention are much more easily processed than polymers produced in conventional polymerization processes. Additionally, the polymers produced according to the present invention can have extremely broad molecular weight distributions and can have excellent characteristics for high stiffness pipe applications.

The high load melt index (HLMI) of polymers produced in accordance with the present invention usually is within a range of from about 2 g/10 minutes to about 20 g/10 minutes. Additionally, polymers produced in accordance with the present invention can have a HLMI within a range from about 3 g/10 minutes to about 15 g/10 minutes. Further, the HLMI of the polymer product is within a range from about 5 g/10 minutes to about 10 g/10 minutes. With respect to ethylene polymers made in accordance with the present invention, the HLMI usually is within a range from about 0.1 g/10 minutes to about 20 g/10 minutes. Still, the ethylene polymers can have a HLMI within a range from about 1 g/10 minutes to about 10 g/10 minutes. Even further, the HLMI of the ethylene polymer product is within a range from about 1.5 g/10 minutes to about 7 g/10 minutes.

The polymers of this invention have a broad molecular weight distribution as evidenced by polydispersity, or weight average molecular weight divided by number average molecular weight ($M_w/M_n$). Generally, the $M_w/M_n$ ratio for polymers produced in accordance with the present invention is at least about 50. In another aspect of the present invention, the $M_w/M_n$ ratio for the inventive polymers is greater than about 80. Yet, in another aspect of the present invention, the $M_w/M_n$ ratio for the inventive polymers is greater than about 100. Still, in another aspect of the present invention, the $M_w/M_n$ ratio for the inventive polymers is greater than about 140 with an upper limit of about 500. The polymers of this invention also have a very narrow density range, usually within a range of from about 0.945 g/cc to about 0.955 g/cc. Additionally, polymers of the present invention may be produced having a density within a range from about 0.947 g/cc to about 0.953 g/cc. Further, polymers of the present invention may be produced having a density within a range from about 0.948 g/cc to about 0.952 g/cc.

Specifically, for ethylene copolymers produced in accordance with the present invention, usually the $M_w/M_n$ ratio is at least about 40. The ethylene copolymers produced in accordance with the present invention may have a $M_w/M_n$ ratio greater than about 50. Further, the ethylene copolymers produced in accordance with the present invention may have a $M_w/M_n$ ratio greater than about 60.

Polymers produced in accordance with the present invention also have high PENT slow crack growth resistance values. Generally, the polymer has a PENT value of greater than about 750 hours. However, polymers produce in accordance with the present invention can also have PENT values greater than about 1000 hours, greater than about 1500 hours, greater than about 1800 hours, and greater than about 2000 hours.

Polymers produced in accordance with this invention have a unique branch distribution. Until now, polymers produced from processes which employ conventional chromium catalysts have a branch content, or amount of comonomer incorporated, that decreases with increasing molecular weight of the polymer. In contrast, polymers of the present invention have a branch content that does not decrease with increasing molecular weight. Further, the polymers of the present invention have a short chain branch content that is substantially constant with the molecular weight of the polymer from a molecular weight of about $10^4$ and higher, at least up to $10^7$. In general, these inventive polymers are characterized by having a high concentration of branching in the molecular weight range of greater than one million. The polymer product generally has greater than about 0.5 short chain branches per thousand carbons (SCB/1000C) at one million molecular weight (MW), Further, the polymer may have greater than about 1 SCB/1000C at one million molecular weight (MW). Still further, the polymer product may have greater than about 1.5 SCB/1000C at one million molecular weight (MW).

The inventive polymer also may be characterized by having a high concentration of branching in the molecular weight range of greater than ten million. The polymer product generally has greater than about 0.5 short chain branches per thousand carbons (SCB/1000C) at ten million molecular weight (MW). Further, the polymer may have greater than about 1 SCB/1000C at ten million molecular weight (MW). Still further, the polymer product may have greater than about 1.5 SCB/1000C at ten million molecular weight (MW).

The polymers of the present invention are additionally characterized by having a relatively high molecular weight. Generally, these inventive polymers have a weight average molecular weight ($M_w$) in a range from about 300,000 g/mol to about 1 million g/mole. Further, polymers of the present invention can have a $M_w$ in a range from about 350,000 g/mol to about 750,000 g/mol. Yet further, polymers of the present invention can have a $M_w$ in a range from about 400,000 g/mol to about 600,000 g/mol. Still further, polymers of the present invention can have a $M_w$ in a range from about an 450,000 g/mol to about 550,000 g/mol.

Despite the high molecular weight, the polymers of the present invention are unique in having a relatively low melt viscosity at low shear rates, compared to polymers derived from conventional chromium based catalysts. While not wishing to be unduly bound by theory, it is thought that this unique combinations of high molecular weight and low melt viscosity is due to the polymer having little or no long chain branching as compared to conventional chromium derived polymers. One measure of this characteristic is the zero shear melt viscosity, which is extrapolated from a the rheology curve at 190° C. Sometimes called eta(0), the zero shear viscosity can be obtained by fitting the Carreau-Yasuda equation to the experimental viscosity derived at 190° C. as a function of shear rate. See R. Byron Bird, Robert C. Armstrong, and Ole Hassager, *Dynamics of Polymeric Liquids, Volume 1, Fluid Mechanics*, (John Wiley & Sons, New York, 1987. Sometimes, during the extrusion of various types of pipe, it is desired for the low shear viscosity not be too large. Otherwise certain fusion and other molding problems can result. In this regard polymers of the present invention have an eta(0) of less than about $5 \times 10^7$ pa-sec. In another aspect of the present invention, the polymers have an eta(0) less than $2.5 \times 10^7$ pa-sec. Yet, in another aspect of the present invention, the polymers have an eta(0) less than $1.5 \times 10^7$ pa-sec. Still, in another aspect of the present invention, the polymers have an eta(0) less than about $1 \times 10^7$ pa-sec.

Alternatively, in other applications, high melt viscosities at low shear rates are desired. This is particularly true of large diameter pipe applications where the pipe can "slump" or deform from the effect of gravity during the slow cool-down period. For these applications, the higher the zero shear viscosity, the more resistant the molten polymer is toward this so-called "slumping" deformation. For applications which require slump resistance, polymers of the present invention generally have an eta(0) greater than about $1 \times 10^6$ pa-sec. In another aspect of the invention, polymers of the present invention have an eta(0) greater than about $5 \times 10^6$ pa-sec. Yet, in another aspect of the invention, polymers of the present invention have an eta(0) greater than about $1 \times 10^7$ pa-sec. Still, in another aspect of the invention, polymers of the present invention have an eta(0) greater than about $2 \times 10^7$ pa-sec.

Despite the high molecular weight of these polymers, and the sometimes high low-shear melt viscosity, the polymers of the present invention are also characterized by having a relatively low melt viscosity at high shear rates. Since the extrusion into pipe is done at relatively high shear rates, a low high-shear melt viscosity is desirable because molten polymer flows easily during the molding operations. Generally, the polymers of the present invention have a melt viscosity of less than $6 \times 10^3$ pa-sec at 100/sec shear rate, called eta(100). In another aspect of the present invention, the polymers of the present invention have an eta(100) of less than $3 \times 10^3$ pa-sec. Yet, in another aspect of the present invention, the polymers of the present invention have an eta(100) of less than $2 \times 10^3$ pa-sec.

Another distinguishing feature of these unique inventive polymers is the narrow relaxation time distribution. The breadth of the relaxation time distribution, sometimes called the CY-a parameter, can also be derived from the Carreau-Yasuda equation cited above, when applied to melt viscosity data obtained at 190° C. as a function of shear rate. CY-a is usually higher than polymers of similar molecular weight derived from conventional chromium catalysts. Generally, the CY-a of these inventive polymers is greater than about 0.2. In another aspect of the present invention, the polymers have a CY-a is greater than about 0.25. Yet, in another aspect of the present invention, the polymers have a CY-a is greater than about 0.3.

A further distinguishing feature of these inventive polymers is that they can be extruded into pipe that meets the rigorous standards of the PE-100, MRS 10, or ASTM D3350 typical cell classification 345566C. This includes hoop stress testing and rapid crack propagation, or S4, testing (see ISO/TC 138/SC 4 Parts 1 & 2 Dated Jan. 1, 2008).

EXAMPLES

The following examples are presented to further illustrate the invention and are not to be construed as unduly limiting the scope of the invention. These examples illustrate the various aspects of the present invention, including a description of catalyst system preparation, catalyst system use in a polymerization process to produce the desired resin, the physical properties of that resin, and its use to make a PE-100 classified, large diameter pipe.

Chromium/Aluminophosphate Catalyst Preparation

The aluminophosphate catalyst system was prepared from a commercial alumina manufactured by W. R. Grace under the name "Alumina A". This material is substantially all alumina after calcination at about 600° C., having a pore volume of about 1.5 cc/g and a surface area of about 300 m$^2$/g. In the preparation of a typical batch of catalyst, about 300 pounds (lbs) of Alumina A was calcined by passing it through a rotary calciner set at about 750° C. in a countercurrent nitrogen flow. In a mix tank equipped with mechanical stirrer, about 900 lbs of anhydrous methanol was added, followed by about 9.0 lbs of ammonium bifluoride and 46 lbs of 85% phosphoric acid. This mixture was stirred until it made a homogeneous solution. After being calcined, the alumina was placed in a mechanical blender to which the above methanolic solution was also added. The resultant slurry was stirred for about two hours, after which 39 lbs of $Cr(NO_3)_3 \cdot 9H_2O$ was added. This mixture was stirred for about another two hours, after which heat was applied to boil off the methanol solvent. Gentle stirring was continued until most of had been removed. The resultant powder was then transferred into a vacuum oven where it was heated at about 60° C. for about 12 hours to remove almost all of the residual methanol. Thereafter, the catalyst was passed through a 30 mesh screen to remove any large agglomerates.

Measurement of Resin Properties

Analysis of the resultant polymers were conducted according to the following procedures, Polymer density was determined in grams per cubic centimeter (g/cc) on a compression molded sample, cooled at about 15° C. per hour, and conditioned at room temperature, about 25° C., for about 40 hours in accordance with ASTM D1505-68 and ASTM D1928, condition C.

High load melt index (HLMI) was determined in grams of polymer per 10 minutes (g/10 min) in accordance with ASTM D1238, Condition 190/21.6, at 190° C. with a 21,600 gram weight.

Melt Index (MI) was determined in grams of polymer per ten minutes in accordance with ASTM D1238, condition 190/2.16, at 190° C. with a 2,160 gram weight.

PENT slow crack growth resistance values were obtained at 80° C. (176° F.) according to ASTM F1473 (2001).

Molecular weights and molecular weight distributions were obtained using a PL 220 SEC high temperature chromatography unit (Polymer Laboratories) with trichlorobenzene (TCB) as the solvent, with a flow rate of 1 mL/minute at a temperature of about 145° C. BHT (2,6-di-tert-butyl-4-methylphenol) at a concentration of 0.5 g/L was used as a stabilizer in the TCB. An injection volume of 200 µL was used with a nominal polymer concentration of 1.5 mg/mL. Dissolution of the sample in stabilized TCB was carried out by heating at about 150° C. for about 5 hours with occasional, gentle agitation. Subsequently, the sample was kept at about 130° C. for approximately 18 hours (overnight) after which it was reheated to about 150° C. for about 2 hours prior to injection. The columns used were three PLgel Mixed A LS columns (7.8×300 mm) and were calibrated with a broad linear polyethylene standard (Phillips Marlex® BHB 5003) for which the molecular weight had been determined.

Molecular weight distributions and branch profiles were obtained through size exclusion chromatography using an FTIR detector. Chromatographic conditions are those described above, and the sample injection volume was 500 µL. Samples were introduced to the FTIR detector via a heated transfer line and flow cell (KBr windows, 1 mm optical path, and ca. 70 uL cell volume). The temperatures of the transfer line and flow cell were kept at 143±1° C. and 140±1° C., respectively. Perkin Elmer FTIR spectrophotometer (PE 2000) equipped with a narrow band mercury cadmium telluride (MCT) detector was used in these studies.

All spectra were acquired using Perkin Elmer Timebase software. Background spectra of the TCB solvent were obtained prior to each run. All IR spectra were measured at 8 cm$^{-1}$ resolution (16 scans). Chromatograms were generated using the root mean square absorbance over the 3000-2700 cm$^{-1}$ spectral region (i.e., FTIR serves as a concentration detector). Molecular weight calculations were made as previously described using a broad molecular weight polyethylene (PE) standard. See Jordens K, Wilkes G L, Janzen J, Rohlfing D C, Welch M B. Polymer 2000;41:7175. Spectra from individual time slices of the chromatogram are subsequently analyzed for comonomer branch levels using chemometric techniques. All calibration spectra were taken at sample concentrations which far exceeded that needed for good signal to noise (i.e., >0.08 mg/mL at the detector).

Branching determination was made as follows. Calibration and verification studies were conducted with solvent gradient fractions having a narrow molecular weight distribution ($M_w/M_n$~1.1 to 1.3). These fractions were composed of polyethylene homopolymers or ethylene copolymers of 1-butene or 1-hexene and low molecular weight alkanes. The total methyl content of these samples ranged from 1.4 to 82.7 methyls per 1000 total carbons. Methyl content of samples was calculated from $M_n$ or measured using C-13 NMR spectroscopy. C-13 NMR spectra were obtained on 15 wt. % samples in TCB using a 500 MHz Varian Unity Spectometer run at 125° C. as previous described. See Randall J C, Hsieh E T, NMR and Macromolecules; Sequence, Dynamic, and Domain Structure, ACS Symposium Series 247, J. C. Randall, Ed., American Chemical Society, Washington D.C., 1984. Methyl content per 1000 carbons by NMR was obtained by multiplying (×1000) the ratio of total methyl signals to total signal intensity.

A partial least squares (PLS) calibration curve was generated using Pirouette chemometric software (Infometrix) to correlate changes in the FTIR absorption spectra with calculated or NMR measured values for methyls/1000 total carbons for the 25 samples. The FTIR absorption spectra used in the calibration model were made from co-added spectra collected across the whole sample. Only a portion of the spectral region (2996 and 2836 cm$^{-1}$) was used in the calibration step in order to minimize the effects of residual solvent absorption. Preprocessing of spectral data included area normalization, taking the first derivative of the spectra and mean centering all data. A three-component calibration model was calculated and optimized using the process of cross validation (RSQ=0.999, SEV=0.5). Outlier detection for individual measurements was generated from probability values obtained through the Pirouette chemometric software. Samples having probabilities >0.99 were considered outliers.

Short chain branching levels were calculated by subtracting out methyl chain end contributions. The number of methyl chain ends ($N_E$) was calculated using the equation $$N_E = (14000)(2 - V_{CE})/M$$

In this equation, $V_{CE}$ is the number of vinyl terminated chain ends and M is the molecular weight calculated for a particular slice of the MWD. Typically, chain termination in chromium catalyzed resins results in the formation of a vinyl moiety. See Witt, D R. Reactivity, Mechanism and Structure in Polymer Chemistry. Jenkins A D, Ledwith A. Eds. Ch 13. John Wiley and Sons. New York. 1974. Conversely, methyl chain ends are formed in the chain termination step of Zeigler-Natta catalyzed resins. See Lenz, R W. Organic Chemistry of Synthetic High Polymers. Ch 15. John Wiley and Sons. New York. 1967. Therefore, in the above equation $V_{CE}$ is assigned 1 for chromium catalyzed resins and 0 for Zeigler-Natta catalyzed resins. Also, the assumption is made that end group types (i.e., methyl or vinyl) remain fixed through out the molecular weight distribution. Negative values for methyls/1000 total carbons that may result from over correction for methyl chain ends at low branching levels are given values of zero. Further details of the procedure can be found in Polymer 2002:43:159, by DesLauriers P J, Rohlfing D C, and Hsieh E T.

Rheology measurements were obtained as follows: Samples for viscosity measurements were compression molded at 182° C. for a total of three minutes. The samples were allowed to melt at a relatively low pressure for one minute and then subjected to a high molding pressure for an additional two minutes. The molded samples were then quenched in a cold (room temperature) press. 2 mm×25.4 mm diameter disks were stamped out of the molded slabs for rheological characterization. Fluff samples were stabilized with 0.1 wt % BHT dispersed in acetone and then vacuum dried before molding.

Small-strain oscillatory shear measurements were performed on a Rheometrics Inc. RMS-800 or ARES rheometer using parallel-plate geometry over an angular frequency range of 0.03–100 rad/s. The test chamber of the rheometer was blanketed in nitrogen in order to minimize polymer degradation. The rheometer was preheated to the initial temperature of the study. Upon sample loading and after oven thermal equilibration, the specimens were squeezed between the plates to a 1.6 mm thickness and the excess was trimmed. A total of about 8 minutes elapsed between the time the sample was inserted between the plates and the time the frequency sweep was started.

Strains were generally maintained at a single value throughout a frequency sweep, but larger strain values were used for low viscosity samples to maintain a measurable torque. Smaller strain values were used for high viscosity samples to avoid overloading the torque transducer and to keep within the linear viscoelasitc limits of the sample. The instrument automatically reduces the strain at high frequencies if necessary to keep from overloading the torque transducer.

These data were fit to the Carreau-Yasuda equation to determine zero shear viscosity ($\eta_0$), relaxation time ($\tau$), and a measure of the breadth of the relaxation time distribution (CY-$\alpha$). See R. Byron Bird, Robert C. Armstrong, and Ole Hassager, *Dynamics of Polymeric Liquids, Volume 1, Fluid Mechanics*, (John Wiley & Sons, New York, 1987.

Pipe Extrusion

Pipe extrusion in the simplest terms is performed by melting, conveying polyethylene pellets into a particular shape (generally a annular shape), and solidifying that shape during a cooling process. There are numerous steps to pipe extrusion including the following:

Feedstock (Assumes Pigmented Pipe)

Feedstock can either be a pre-pigmented polyethylene resin or it can be a mixture of natural polyethylene and color concentrate (referred to as "Salt and Pepper blends"). In North American, the most common feedstock for pipe extrusion is "Salt and Pepper blends". In Europe and other areas of the world, the most common feedstock for pipe extrusion is pre-pigmented polyethylene resin.

Feedstock is rigidly controlled to obtain the proper finished product (pipe) and ultimate consumer specifications.

Extruder

The most common extruder system for pipe production is a single-screw extruder.

The purpose of the extruder is to melt, convey and homogenize the polyethylene pellets.

Extrusion temperatures typically range from 178° C. to 232° C. depending upon the extruder screw design and flow properties of the polyethylene.

Die

The purpose of the die is to distribute the homogenous polyethylene polymer melt around a solid mandrel, which forms it into an annular shape.

Adjustments can be made at the die exit to try to compensate for polymer sag through the rest of the process.

Pipe Sizing

In order for the pipe to meet the proper dimensional parameters, pipe sizing is the next step in the process.

There are two methods for sizing—vacuum or pressure. Both employ different techniques and different equipment.

Cooling

The next steps in the process are to cool the pipe and "freeze in" the desired dimensions.

Cooling is accomplished by the use of several water tanks where the outside pipe is either submerged or water is sprayed on the pipe exterior.

The pipe is cooled from the outside surface to the inside surface. The interior wall and inside surfaces of the pipe can stay very hot for a long period of time, as polyethylene is a poor conductor of heat.

Printing, Coiling or Cutting

The final steps in the extrusion process for pipe are to print, and either coil or cut-to-length the pipe.

EXAMPLE 1

Catalyst Activation

The above-described catalyst was activated by calcination in dry air at 600° C. In a typical activation batch, about 500 lbs of the catalyst was added to commercial activator consisting of a porous plate inside 42 inch diameter inconel cylinder about 20 feet in height. The catalyst rested on the porous plate, through which dry air was passed at the rate of about 0.2 feet/second (ft/sec) in order to fluidize the bed. The temperature was gradually raised to about 600° C. over a period of about 8–10 hours. Once at 600° C., the activator was allowed to remain at that temperature, while fluidizing, for about another 10 hours. The activated catalyst was then cooled down to about 300° C., at which temperature the activated catalyst was removed from the activator. During the last 2–3 hours of the cool-down period, the fluidization air was replaced by dry nitrogen. After removal from the activator, the catalyst was stored under nitrogen in an air-tight container until its use in the polymerization reactor.

Polymerization

The activated catalyst described above was used to catalyze the copolymerization of ethylene and 1-hexene to make the novel polymers of the present invention. The reactor system used was a 24 inch diameter 3-legged loop reactor containing about 27,000 gallons of polymer slurry. The diluent used was prepurified isobutane, and the reactor contents were controlled so that they were typically about 38% by weight solid polymer and 62% by weight of liquid reactants and diluent. Catalyst, ethylene, 1-hexene, isobutane, triethylboron solution, and hydrogen were all added continuously to the reactor. The reactor temperature was set at about 101° C. Polymer and liquid were removed continuously through flashing, in which a small increment of the reactor contents were vented into a large collection tank. The liquid components then vaporized instantly, leaving the dry polymer powder. The production rate was about 30,000 lbs of polymer produced per hour. Ethylene was supplied on demand to maintain this rate and a dissolved ethylene concentration in the diluent of about 3 to 4 percent by weight of the liquid reactor contents. Hydrogen was supplied continuously to maintain a polymer high load melt index (HLMI) of from 2.0 to 3.5, which resulted in a reactor concentration of about 1.0 to 1.5 mole percent of the liquid contents. 1-Hexene comonomer was supplied on demand in order to maintain a polymer density of about 0.950, which resulted in a concentration of 0.4 to 1.0 percent by weight of the reactor liquid contents. Triethylboron was continuously added to the reactor to maintain a concentration of about 10 parts per million by weight of the reactor liquid contents. The productivity of the catalyst was about 1300 lbs polymer per pound of catalyst.

After the polymer exited the reactor it was purged with nitrogen at about 50° C. to about 70° C. for about two hours to remove the last traces of hydrocarbon reaction mixture. It was then pelletized in a commercial Warner-Pfleider ZSK continuous extruder with appropriate small amount of antioxidants. The final high load melt index was about 2.3 and the final density was found to be about 0.950.

A study was conducted of the inventive polymer of Example 1 and four commercially available PE-100 bimodal polyethylene resins to compare various properties of the respective resins. The results are reported below in Table 1.

Another study was conducted to compare various properties of pipe formed from the inventive polymer of Example 1 and a non-PE-100 resin having commercially acceptable slump characteristics. The results are reported below in Table 2. The comparisons in Table 2 for pipe extrusion show the versatility of the inventive resin. Pipes as large as 42 inches in diameter with a wall thickness of 2.5 inches and as small as 2 inches in diameter with a wall thickness of 0.18 inch have been successfully produced. The inventive resin is compared to typical PE3408 resins that perform well in those pipe sizes. The PE3408 resins were Chevron Phillips Chemical Company's HD 943 ethylene/1-hexene copolymer which were made with a conventional chromium catalyst. Initially, the PE3408 resins were extruded into pipe and thereafter, the inventive resin was extruded through the same die initially at the same die setting. As indicated in note (3) of Table 2, the die for the 42" diameter pipe had been adjusted to be out of round to accommodate slumping of the PE3408 resins. Upon extrusion of the inventive resin of Example 1 through the die, the die was adjusted to substantially true round, indicating that the inventive resin had no or substantially no slump. Other PE-100 type resins, which are bimodal polyethylene resins, either cannot be successfully extruded into 42" IPS DR 11 pipe or suffer a severe penalty for pipe extrusion rate due to excessive heat generation and subsequent pipe sag or slumping. Although the inventive resin of Example 1 produced pipe which can be classified as PE-100 pipe, as discussed above, the conventional PE-100 resins are not employed to produce 42" diameter PE-100 pipe due to their excessive slumping characteristics.

Per D2513 "Standard Specification for Thermoplastic Gas Pressure Pipe, Tubing, and Fittings", the maximum wall thickness eccentricity is 12% and the maximum ovality is 5%. The data in Table 2 show the inventive resin to fall within those ranges for both the 42" and the 2" pipes.

EXAMPLES 2–19

Catalyst Preparation:

Several runs were made at a pilot plant scale employing the catalyst system of the present invention. The procedure used in Example 1 to prepare the catalyst was also used in these examples, except that the amount of phosphoric acid added to the preparation was adjusted to vary the P/Al molar ratio of the resultant catalyst. Other steps were identical. Catalyst activation was similarly carried out in a fluidized bed in air at about 600° C. in all cases. 1.5 lbs of catalyst was charged to a six-inch diameter cylinder with distributor plate for fluidization. Dry air was used to fluidize the catalyst as the temperature was raised to about 600° C. This process required about eight hours, and the catalyst was allowed to remain fluidizing in dry air at about 600° C. for about another six hours. The catalyst was flushed with dry nitrogen during cool-down and then stored under nitrogen until ready for use.

Polymerization

Ethylene polymers were prepared in Examples 2–19 in a continuous particle form process (also known as a slurry process) by contacting the catalyst with ethylene and 1-hexene comonomer. Ethylene which had been dried over activated alumina was used as the monomer. Isobutane which had been degassed by fractionation and dried over alumina was used as the diluent.

The reactor was a liquid full 15.2 cm diameter pipe loop having a volume of 23 gallons (87 liters). Liquid isobutane was used as the diluent, and occasionally some hydrogen was added to regulate the molecular weight of the polymer product. The reactor pressure was about 4 Mpa (about 580 psi). The reactor temperature was varied over a range of about 90° C. to about 105° C. as indicated in each experiment. The reactor was operated to have a residence time of 1.25 hours. Catalyst was added through a 0.35 cc circulating ball-check feeder. At steady state conditions the isobutane feed rate was about 46 liters per hour, the ethylene feed rate was about 30 lbs/hr, and the 1-hexene feed rate was varied to control the density of the polymer product. Ethylene concentration in the diluent was 8–12 mole percent, as indicated in each experiment. Polymer was removed from the reactor at the rate of about 23 lbs per hour and recovered in a flash chamber. A Vulcan dryer was used to dry the polymer under nitrogen at about 60° C. to about 80° C.

Cocatalysts were used, including triethylaluminum (TEA), triethylboron (TEB), and a mixture of 3 parts by weight TEB and 1 part by weight TEA. The concentration of total cocatalyst was varied from about 2 ppm to up to about 14 ppm, as indicated in each example, expressed with reference to the isobutane diluent. To prevent static buildup in the reactor, a small amount (<5 ppm of diluent) of a commercial antistatic agent, sold as Stadis 450, was usually also added.

Resin Testing

Polymer molecular weights, branch profiles, and rheology were determined as described above. Pipe was made at about two inches in diameter on a 2.5 inch extruder at 210° C.

Discussion of Results

Tables 3 and 4 show the results of resin and pipe testing of 12 different experimental resins made in the pilot plant from the inventive catalyst. As indicated in Tables 3 and 4, cocatalyst type and amount, reactor temperature and other reaction variables, and the catalyst P/Al molar ratio were all varied. The hoop stress testing is shown for three different temperatures, along the ISO corresponding requirements needed for PE-100 certification. As reported in Tables 3 and 4, many cases values in considerable excess of the PE-100 qualification values were obtained. Some extremely high PENT tests were also obtained and are reported in Tables 3 and 4.

Table 5 shows another series of experimental resins which were made from the same catalyst system. In these runs the catalyst had a P/Al molar ratio of about 0.08 and was activated at about 600° C. The reactor temperature was about 213° F., the cocatalyst was TEB, and ethylene was added to maintain 10 mol % in the reactor. 1-Hexene was added to the reactor at about 0.8 to 1 lbs/hr, and ethylene at about 22.5 lbs/hr. Although these resins were not extruded into pipe, physical properties were obtained, and Table 5 is presented to demonstrate the high CY-a parameters which can rise from the catalyst system of the present invention. As discussed above CY-a varies inversely with the rheological breadth, or the breadth of the relaxation time distribution. Low CY-a indicates greater breadth. Conventional chromium catalysts generally produce resins having CY-a between 0.1 and 0.2, and occasionally CY-a values as high as 0.22 are obtained. However, as reported in Tables 3 and 5, and especially in Table 5, the catalyst system of the present invention yields extraordinarily high CY-a values for a chromium catalyst. In general CY-a decreases as the molecular weight is raised and as the chromatographic breadth ($M_w/M_n$) is broadened. This makes the CY-a values in Tables 3, 4, and 5 all the more remarkable, because the resins of the present invention encompass chromatographic breadth ($M_w/M_n$) previously unobtainable and were made at extremely high molecular weight. Nevertheless, it is believed that the resins of the present invention yield high CY-a values that are superior to resins produced from conventional chromium based catalysts. This seemingly contradictory data, that is, extreme chromatographic breadth combined with extreme rheological narrowness, is again interpreted as evidence that these resins are devoid of long chain branching to an unprecedented extent.

Figure 2:
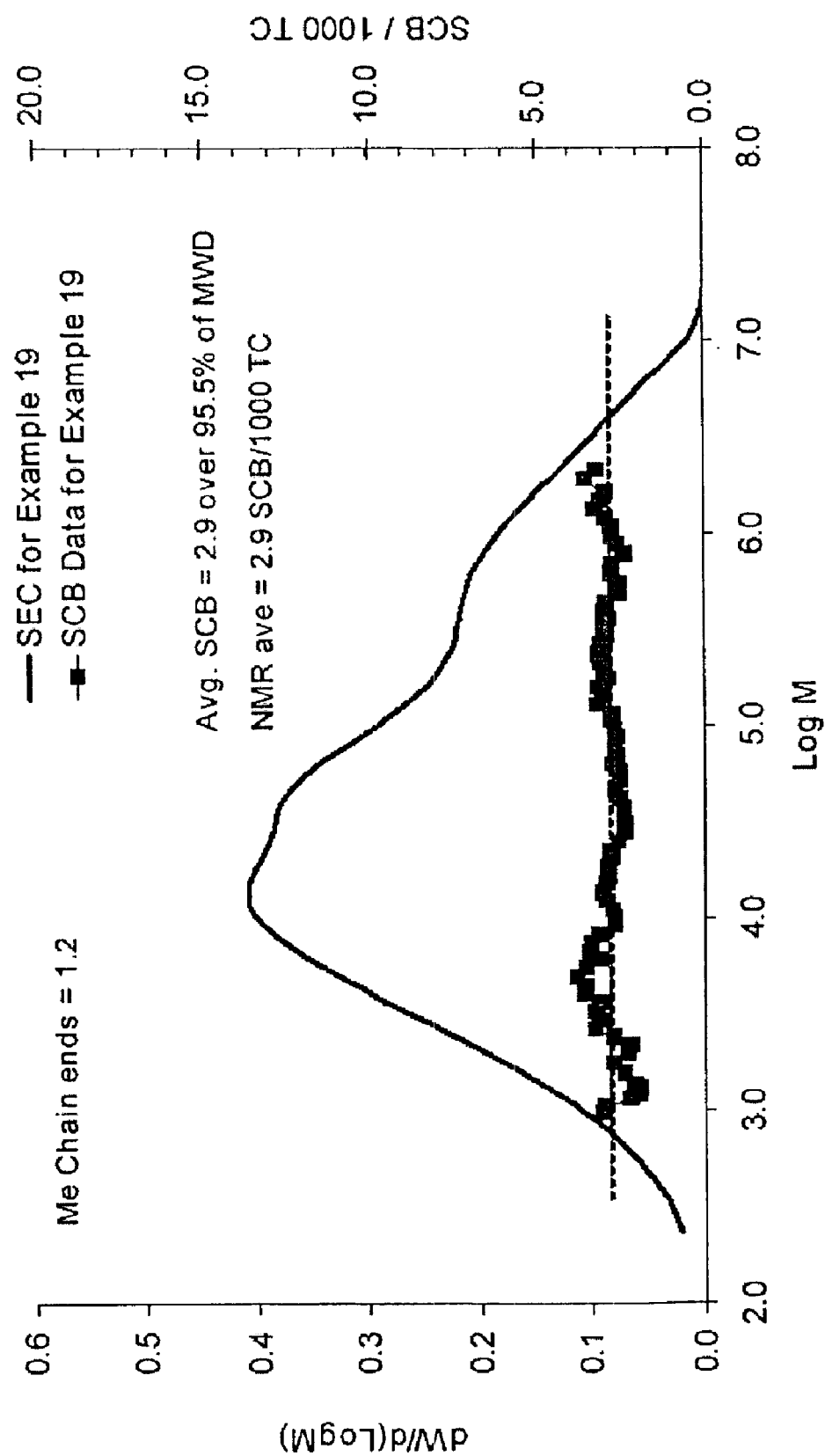
FIG. 2 is a graph further illustrating the substantially constant short chain branch distribution across the molecular weight distribution of the PE-100 polyethylene copolymer made in accordance with the present invention in Example 19, even though the molecular weight profile is considerably different from that shown for Example 1.

Referring to FIGS. 1 and 2, number average molecular weights ($M_w/M_n$) at various polymer molecular weights were determined for the inventive polymers of Examples 1 and 19. Further, short chain branches per 1000 carbons (SCB/1000C) were determined for these polymers at various polymer molecular weights. As shown in FIGS. 1 and 2, $M_w/M_n$ and SCB/1000C, indicated as SCB/1000TC, for the inventive polymers of Examples 1 and 19, respectively, were plotted with respect to polymer molecular weight. Both figures indicate that the polymers of the present invention have a flat or substantially flat short chain branching profile across a broad molecular weight profile. This indicates that short chain branching of the polymers of the present invention remains substantially constant across a broad range of molecular weights.

Figure 3:
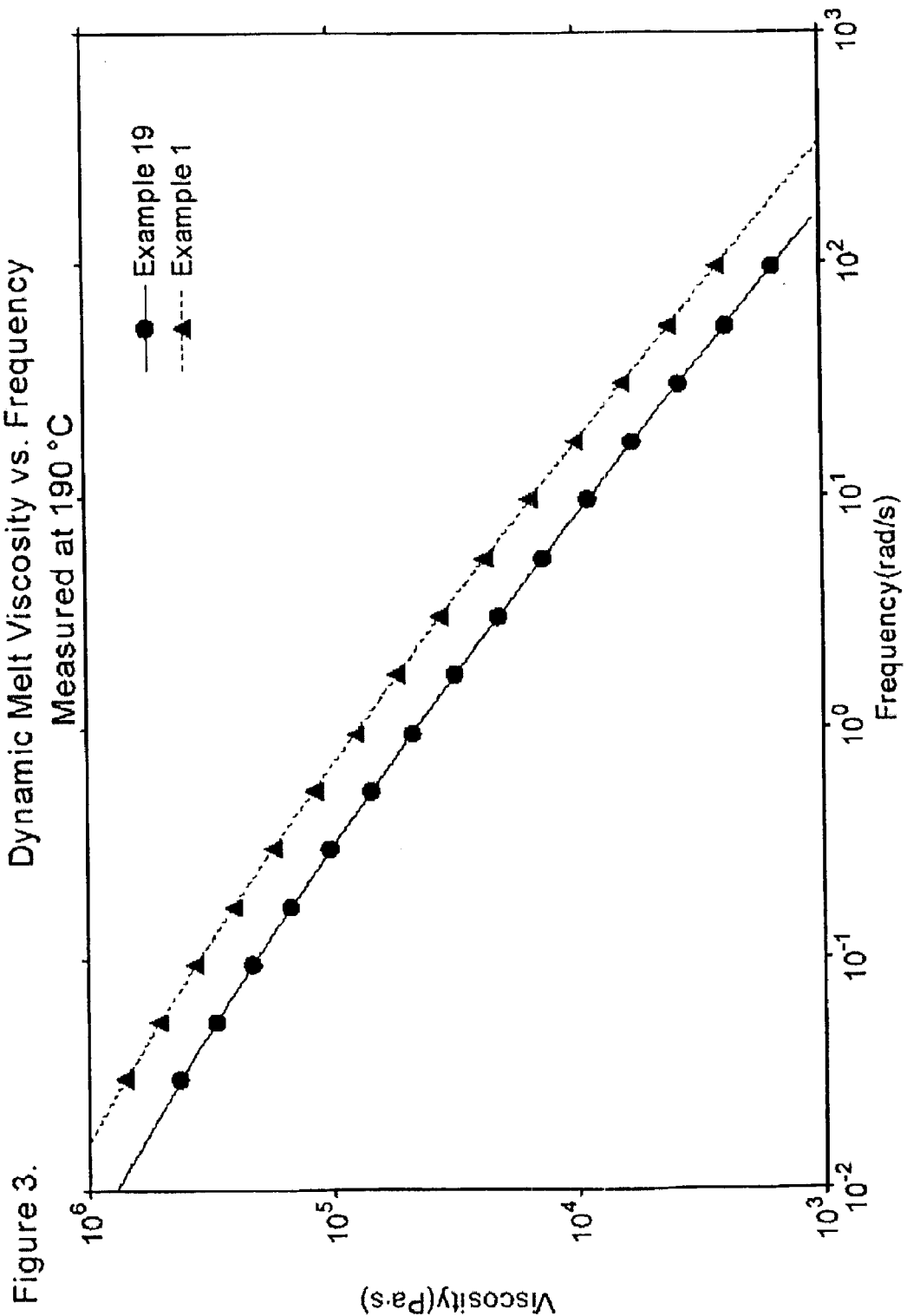
FIG. 3 is a graph showing typical rheology curves at 190° C. of the inventive polyethylene copolymers as demonstrated by Examples 1 and 19.

With reference to FIG. 3, melt viscosities and shear rates were determined and examined for the inventive polymers of Examples 1 and 19. As shown in the figure, melt viscosity was plotted with respect to shear rate to produce the respective curves. As indicated in FIG. 3, each inventive polymer has a high shear rate at low melt viscosity and, in contrast, a low shear rate at high melt viscosity. As an extrudable polymer, it is desirable for the polymer to have a high shear rate at low melt viscosity due to the ease of passing the polymer through the die. However, to assist in the prevention or reduction of slumping after the polymer passes through the extruder, it is desirable for the polymer to have a high shear rate at high melt viscosity. FIG. 3 illustrates that the polymers of the present invention have both desirable properties for the production of PE-100 pipe.

TABLE 1

Commercial Pipe Properties For PE-100 Resins

| Property | Marlex ® H516B | Inventive Resin of Example 1 | Dow DGDA-2490 | Atofina Finathene ® XS-10B | BP Solvay Eltex ® TUB121 |
|---|---|---|---|---|---|
| MI, g/10 min. | 0.08 | 0.0 | 0.07 | 0.07 | 0.07 |
| HLMI, g/10 min. | 7.1 | 2.1 | 7.0 | 10.1 | 8.8 |
| Density, g/cc | 0.962 | 0.950 | 0.949 | 0.960 | 0.959 |
| Density, g/cc (natural calculated) | 0.952 | | | 0.951 | 0.950 |
| Carbon Black Content, wt % | 2.4 | 0 | 0 | 2.4 | 2.2 |
| Rheology Data | | | | | |
| Eta 0/sec | 2.07E+05 | 1.82E+07 | 2.08E+05 | 3.31E+05 | 2.34E+05 |
| Eta at 0.1/sec | 7.23E+04 | 3.57E+05 | 8.10E+04 | 8.18E+04 | 8.42E+04 |
| Eta at 100/sec | 2.46E+03 | 2.56E+03 | 1.76E+03 | 2.11E+03 | 2.24E+03 |
| Tau Eta | 1.2 | 432 | 5.4 | 2.8 | 2.0 |
| Tensile Properties | | | | | |
| Tensile at Yield, psi | 3,840 | 3,760 | 3,800 | 3,890 | 3,720 |
| Tensile at Break, psi | 5,220 | 4,300 | 5,110 | 4,700 | 5,200 |
| Elongation at Break, % | 720 | 670 | 700 | 700 | 740 |
| Flexural Modulus, 2% Secant, psi | 135,700 | 122,700 | 128,200 | 132,200 | 128,500 |
| Typical SEC Data for natural resin | | | | | |
| Mn (g/mol) | 16,000 | 7,500 | | | |
| Mw (g/mol) | 280,000 | 490,000 | | | |
| Mz (g/mol) | 1,600,000 | 3,500,000 | | | |
| Mw/Mn | 18 | 65 | | | |
| PENT, hrs | >1100 | >1000 | 3360 | >2180 | >2300 |

TABLE 2

Commercial Pipe Extrusion Processing Data

| Extrusion Properties | Inventive Resin of Example 1 | Commercial Gas Phase PE3408 Pressure Rated Resin |
|---|---|---|
| Production Rate, lb/hr | 1725 | 1700 |
| Pipe Size | 42" IPS DR 17 | 42" IPS DR 17 |
| % Ovality (1) | 2.5 | 2.2 |
| Wall Thickness Eccentricity, % (2) | 9.9 | 5.6 |
| Pipe Extruder Size | 6" | 6" |
| Extruder L/D | 30:1 | 30:1 |
| Comments | (3) | |

TABLE 2-continued

Commercial Pipe Extrusion Processing Data

| Extrusion Properties | Inventive Resin of Example 1 | Commercial PF PE3408 Pressure Rated Resin |
|---|---|---|
| Production Rate, lb/hr | 780 | 800 |
| Pipe Size | 2" IPS DR 11 | 2" IPS DR 11 |
| % Ovality (1) | 0.54 | 0.51 |
| Wall Thickness Eccentricity, % (2) | 3.5 | 2.2 |
| Pipe Extruder Size | 4.5" | 4.5" |
| Extruder L/D | 30:1 | 30:1 |

(1) % Ovality in ASTM D2513 is [(Maximum OD − Maximum OD)/(Minimum OD + Maximum OD)] × 200
(2) Wall thickness eccentricity (E) defined in ASTM D2513 is [(A − B)/A] × 100 where A is maximum wall thickness and B is minimum wall thickness
(3) Slump between the die face and the sizing sleeve was noticeably less and required a die adjustment to substantially true round indicating no or substantially no slump.

TABLE 3

| Example | 2 | 3 | 4 | 5 | 6 | 7 |
|---|---|---|---|---|---|---|
| P/Al Mol Ratio | 0.09 | 0.12 | 0.12 | 0.12 | 0.12 | 0.08 |
| Reaction Temp. (deg F.) | 212.3 | 214.8 | 214.8 | 214.9 | 214.9 | 190.4 |
| Ethylene Conc (mol %) | 8.91 | 6.61 | 6.61 | 11.21 | 7.32 | 9.98 |
| H2 Conc. (mol %) | 1.87 | 0.79 | 0.79 | 1.23 | 0.25 | 2.29 |
| 1-Hexene Conc (mol %) | 0.62 | 0.30 | 0.30 | 0.54 | 0.41 | 1.25 |
| Cocatalyst Type | TEB | 3:1TEB:TEA | 3:1TEB:TEA | 3:1TEB:TEA | 3:1TEB:TEA | 3:1TEB:TEA |
| Cocatalyst Conc (ppm) | 10.2 | 2.6 | 2.6 | 3.9 | 11.7 | 3.0 |
| Hexene, lb/hr | 0.8 | 0.9 | 0.9 | 1.63 | 1.2 | 1.9 |
| Ethylene, lb/hr | 25.3 | 21.5 | 21.5 | 22.74 | 21.9 | 25.5 |
| HLMI (g/10 min) | 5.1 | 4.7 | 4.7 | 5.7 | 5.8 | 2.23 |
| Density (g/cc) | 0.9501 | 0.9496 | 0.9492 | 0.9489 | 0.9489 | 0.9488 |
| Catalyst Productivity *Lb/Lb) | 1851.85 | 1541 | 1541 | 2370 | 1388 | 2899 |
| SEC Mn/1000 | 7.5 | 7.5 | 8.2 | 5.3 | 5.2 | 6 |
| Mw/1000 | 368 | 410 | 442 | 394 | 441 | 405 |
| Mz/1000 | 3053 | 3133 | 3420 | 3431 | 4932 | 3127 |
| Mw/Mn | 49.4 | 54.3 | 53.7 | 73.9 | 85.1 | 67.8 |
| Rheology Eta(0) | 6.75E+06 | 8.70E+06 | 1.07E+07 | 1.02E+07 | 1.90E+07 | 1.32E+07 |
| CY-a_eta | 0.2661 | 0.2855 | 0.2802 | 0.2903 | 0.2618 | 0.2943 |
| PENT, hrs (2.4 MPa) | 3375 | >1411 | >1411 | >1680 | >1657 | >4822 |
| Pipe Extrusion | | | | | | |
| Output pounds/hr/rpm | | 1.76 | 1.7 | 1.73 | 1.67 | 1.79 |
| Head Pressure, psi | | 2970 | 2950 | 2250 | 2220 | 2590 |
| Die Pressure, psi | | 1300 | 1200 | 860 | 750 | 1120 |
| Melt Temp, F. | | 428 | 430 | 407 | 404 | 405 |
| Pressure Testing (ISO requirement) | Passed | Passed | Passed | Passed | Failed | Passed |
| 20 C., 1800 psi, hrs (>100 hrs) | 261, 277, 307 | 642, 535, 417 | 585, 608, 441 | 472, 654, 600 | 183, 146, 183 | 263, 424, 260 |
| 80 C., 770 psi, hrs (>165 hrs) | 720, 864, 1109 | 618, 968, 955 | 916, >1048, >1049 | 367, >1066, 408 | 26, 20, 38 | >1121, 972, 692 |
| 80 C., 725 psi, hrs (>1000 hrs) | 1429, 1740, 2002 | >1026, >1026, >1026 | >1007, >1026, >1026 | >1026, >1026, >1026 | 210, 189, 245 | >1049, >1049, >1049 |

TABLE 4

| Example | 8 | 9 | 10 | 11 | 12 | 13 |
|---|---|---|---|---|---|---|
| P/Al Mol Ratio | 0.08 | 0.08 | 0.08 | 0.12 | 0.12 | 0.12 |
| Reaction Temp. (deg F.) | 213.8 | 213.8 | 213.6 | 214.9 | 214.9 | 215.0 |
| Ethylene Conc (mol %) | 10.14 | 9.95 | 10.00 | 6.20 | 6.20 | 10.28 |
| H2 Conc. (mol %) | 1.62 | 1.49 | 1.36 | 2.61 | 2.61 | 1.07 |
| 1-Hexene Conc (mol %) | 0.29 | 1.26 | 1.06 | 0.11 | 0.11 | 0.27 |
| Cocatalyst Type | 3:1TEB:TEA | 3:1TEB:TEA | 3:1TEB:TEA | TEA | TEA | TEA |
| Cocatalyst Conc (ppm) | 3.1 | 12.0 | 12.3 | 1.04 | 1.04 | 5.02 |
| Hexene, lb/hr | 0.7 | 0.6 | 0.5 | 0.4 | 0.4 | 0.2 |
| Ethylene, lb/hr | 25.5 | 25.2 | 25.1 | 23.3 | 23.3 | 21.7 |
| HLMI (g/10 min) | 1.23 | 3.5 | 3.0 | 2.0 | 2.1 | 5.3 |
| Density (g/cc) | 0.9495 | 0.9493 | 0.9497 | 0.9487 | 0.9486 | 0.9498 |
| Catalyst Productivity *Lb/Lb) | 2564 | 1818 | 1754 | 1053 | 1053 | 1531 |
| SEC Mn/1000 | 7 | 6 | 5.1 | 8.2 | 8.04 | 4.2 |
| Mw/1000 | 487 | 452 | 450 | 410 | 426 | 427 |
| Mz/1000 | 3235 | 3810 | 3394 | 3108 | 3192 | 3826 |
| Mw/Mn | 70.8 | 78.3 | 88.6 | 49.9 | 52.9 | 101.1 |
| Rheology Eta(0) | 1.04E+07 | 5.52E+06 | 7.04E+06 | 8.84E+06 | 8.29E+06 | 1.33E+07 |
| CY-a_eta | 0.3610 | 0.3361 | 0.3319 | 0.2693 | 0.2723 | 0.249 |
| PENT, hrs (2.4 MPa) | >4822 | >1747 | >1774 | >1411 | >1367 | >1963 |
| Pipe Extrusion | | | | | | |
| Output pounds/hr/rpm | 1.55 | 1.79 | 1.81 | 1.75 | 1.71 | 2.17 |
| Head Pressure, psi | 3550 | 2500 | 2710 | 2980 | 2950 | 2270 |
| Die Pressure, psi | 1480 | 1100 | 940 | 1450 | | 950 |
| Melt Temp, F. | 410 | 408 | 409 | 409 | 408 | 405 |
| Pressure Testing (ISO requirement) | Passed | Failed | Passed | Passed | Passed | Failed |
| 20 C., 1800 psi, hrs (>100 hrs) | >1031, >1031, 627 | 167, 240, 134 | 356, 473, 372 | 213, 297, 315 | 272, 272, 264 | 144, 81, 102 |
| 80 C., 770 psi, hrs (>165 hrs) | >1121, >1119, >1121 | 51, 38, 66 | >1145, >1145, >1141 | >716, >716, >716 | >716, >716, >716 | 105, 132, 87 |
| 80 C., 725 psi, hrs (>1000 hrs) | >1031, >1031, >1031 | >498, >498, >498 | >1145, >1145, >1145 | >716, >716, >716 | >716, >716, >716 | >433, >433, >433 |

TABLE 5

| Example | 14 | 15 | 16 | 17 | 18 | 19 |
|---|---|---|---|---|---|---|
| H2 Conc. (mol %) | 1.008 | 0.503 | 0.969 | 1.472 | 0.957 | 1.3 |
| 1-Hexene Conc (mol %) | 0.339 | 0.389 | 0.376 | 0.377 | 0.476 | 2.33 |
| Concentration of TEB (ppm) | 3.19 | 3.17 | 10.55 | 10.66 | 5.28 | (3:1 TEA/TEB) |
| Catalyst Productivity (Lb/Lb) | 2500 | | 1923 | 2326 | 2703 | 1613 |
| HLMI (g/10 min) | 1.53 | 0.93 | 1.76 | 2.75 | 1.09 | 9.4 |
| Density (g/cc) | 0.9492 | 0.9476 | 0.9488 | 0.9486 | 0.9484 | 0.9533 |
| SEC Data | | | | | | |
| Mn/100 | 6.86 | 6.68 | 6.34 | 5.94 | 6.36 | 4.84 |
| Mw/1000 | 483.5 | 513.9 | 490.1 | 459.5 | 498.7 | 324.0 |
| Mz/1000 | 2823.5 | 2861 | 2873.1 | 2808.5 | 2806.1 | 2824.8 |
| Mw/Mn | 70.6 | 77.2 | 77.5 | 77.7 | 80.3 | 67.0 |
| Rheology Data-Dynamic | | | | | | |
| Eta(0) | 1.00E+07 | 1.35E+07 | 8.07E+06 | 6.94E+06 | 1.20E+07 | 2.16E+07 |
| CY-a_eta | 0.3486 | 0.3738 | 0.3811 | 0.3613 | 0.3723 | 0.2690 |

In the following examples, data are included in the examples about catalyst system preparation, polymerization conditions, as well as the resultant polymers. All chemical handling, including reactions, preparations and storage, was performed under a dry, inert atmosphere (usually nitrogen), unless otherwise indicated.

Polymerization Processes

Polymerization runs for the following examples were conducted using both a bench scale reactor and a loop reactor. Bench scale polymerizations were carried out in a 2.2 liter, stirred autoclave reactor equipped with a steel jacket for precise temperature control. Unless otherwise stated, a small amount (usually 0.01 to about 0.10 grams) of solid chromium containing catalyst was first charged under nitrogen to the dry reactor. Next, 1.2 liters of isobutene liquid was charged and the reactor was heated up to the specified temperature, usually around 95° C. (203° F.). When a cocatalyst was used, such as triethylboron (TEB) or triethylaluminum (TEA), a small amount (usually 1–2 mL) of a solution containing 1 weight percent of the cocatalyst diluted in heptane was added midway during the isobutane addition. Finally, ethylene was added to the reactor to bring the total reactor pressure to 550 pounds per square inch gauge (psig), which was maintained during the polymerization run. Stirring was continued for a specified time, usually around 1 hour, with the catalyst system activity being noted by recording the amount of ethylene flowing into the reactor required to maintain the set pressure. After the specified time, ethylene flow was discontinued and the reactor was allowed to depressurize and subsequently was opened to recover a granular polymer powder. In all cases, the reactor was clean with no indication of any wall scale, coating, or other forms of fouling. The polymer powder was removed and weighed. Activity was specified as grams of polymer produced per gram of solid catalyst charged per hour.

Polymerization runs were also carved out under continuous particle form process conditions in a loop reactor (also known as a slurry process) by contacting a chromium containing solid catalyst system with ethylene and sometimes 1-hexene as indicated. Ethylene used was polymerization grade ethylene (obtained from Union Carbide Corporation) which was purified through a column of alumina and activated at 250° C. (482° F.) in nitrogen. 1-Hexene, when used, was polymerization grade 1-hexene (obtained from Chevron Chemicals Company) which was purified by nitrogen purging and storage over 13× molecular sieve activated at 250° C. (482° F.) in nitrogen. The loop reactor was a liquid full, 15.2 cm diameter, loop reactor, having a volume of 23 gallons (87 liters). Liquid isobutane was used as the diluent, and occasionally some hydrogen was added to regulate the molecular weight of the polymer product. The isobutane was polymerization grade isobutane (obtained from Phillips Petroleum Company, Borger, Tex.) which was further purified by distillation and subsequently passed through a column of alumina and activated at 250° C. (482° F.) in nitrogen.

Reactor conditions included a pressure around 580 psi (4 MPa), and a temperature that was varied from about 65° C. (149° F.) to about 110° C. (230° F.) as indicated in the examples below. Also, the reactor was operated to have a residence time of 1.25 hours. The catalyst systems were added through a 0.35 cc circulating ball-check feeder. Catalyst system concentrations in the reactor were within a range of from about 0.001 to about 1 weight percent based on the weight of the total reactor contents. Polymer was removed from the reactor at the rate of about 25 lbs per hour and recovered in a flash chamber. A Vulcan dryer was used to dry the polymer under nitrogen at about 60–80° C. (140–176° F.).

Cocatalysts such as triethylaluminum (TEA) and triethylboron (TEB) (obtained from Akzo Corporation) were also used. These cocatalysts were obtained as one molar solutions in heptane, but were further diluted to 1 weight percent. The cocatalysts were added as indicated in a concentration in a range of from about 1 to about 30 parts per million of the diluent in the polymerization reactor(s). To prevent static buildup of the reactor, a small amount (less than 5 ppm, by weight, of diluent) of a commercial antistatic agent sold as "Stadis 450" was usually added.

EXAMPLE 20

This example illustrates the preparation of various catalyst systems used in the following Examples.
Chromium/Aluminophosphate Catalyst Systems Aluminophosphate catalyst systems were prepared from a concentrated syrup containing aluminum nitrate nonahydrate, ammonium phosphate monobasic, and chromium nitrate. A small amount of water was added, usually about the same amount as the aluminum nitrate, and was warmed to about 40° C. (104° F.) to dissolve the mixture. The aluminum nitrate and aluminum phosphate monobasic were added in an amount needed to yield the desired phosphorus to aluminum mole ratio (P/Al). For example, to achieve a phosphorus to aluminum mole ratio (P/Al) of 0.2 in the final catalyst system, 0.2 moles of ammonium phosphate monobasic were added for each mole of aluminum nitrate nonahydrate. Chromium nitrate was added in an amount needed to yield 1 weight percent chromium on the final product. To this syrup then was added, with rapid and vigorous stirring, concentrated ammonium hydroxide to form a gel with a pH around 5–7. This gel was broken up and slurried in water to which more ammonium hydroxide was added to adjust the pH to about 8–9. At this pH, the slurry was heated to 60° C. (140° F.)-80° C. (176° F.) for about 1 hour, where it was aged. The slurry was then filtered, washed in about five times its volume in water, and filtered again. This process was repeated three times. The filtrate was given a final wash in n-propanol, filtered again, and dried at 110° C. (230° F.) under half an atmosphere of vacuum for 12 hours. The dried catalyst system was then pushed through a 35 mesh screen containing a 0.50 mm opening.

Some catalyst systems also were treated with fluoride by dissolving the desired amount of ammonium bifluoride in methanol. This solution was adjusted so that the resulting impregnated catalyst systems would come to the point of incipient wetness, and the solution then was impregnated onto or into the catalyst systems. The resultant damp powder then was dried again under half an atmosphere of vacuum at 110° C. (230° F.) for 12 hours.
Other Catalyst Systems Other polymerization catalyst systems were used in the following examples and were loaded with about 1 weight percent chromium, unless otherwise indicated. 963 Magnapore®, 965 Sylopore®, and 969 MS are three polymerization catalyst systems that were used and are commercially available from Davison Chemical Company, a divisional of W. R. Grace & Co. 963 Magnapore®, a high porosity silica-titania catalyst system, was prepared in accordance with U.S. Pat. No. 3,887,494, the entirety of which is incorporated herein by reference. 963 Magnapore® contained 2.5 weight percent titanium, possessed a surface area of about 550 m$^2$/g, and a pore volume of about 2.2 to about 2.5 cc/g. 965 Sylopore®, a lower porosity silica-titania catalyst system, was prepared in accordance with U.S. Pat. No. 4,981,83, the entirety of which is incorporated herein by reference. 965 Sylopore® contained 2.5 weight percent titanium, possessed a surface area of about 380 m$^2$/g, and a pore volume of about 0.9 cc/g. 969MS, a silica supported catalyst system possessed a surface area of about 300 m$^2$/g and a pore volume of 1.6 cc/g.
Activation of Catalyst Systems On the bench scale reactor, described above, catalyst systems were activated by placing about 10 grams of the catalyst system in a 1.75 inch quartz tube fitted with a sintered quartz disk at the bottom. While catalyst systems were supported on the disk, dry air was blown up through the disk at the linear rate of about 1.6 to 1.8 standard cubic feet per hour. An electric furnace around the quartz tube was then turned on and the temperature was increased at the rate of 400° C. (752° F.) per hour to the desired temperature, such as, for example, 600° C. (1112° F.). The catalyst system was then collected and stored under dry nitrogen, where it was protected from the atmosphere until tested.

For the 23 gallon loop reactor, larger quantities of catalyst systems similarly were activated. The catalyst systems were activated by charging 1.5 pounds of catalyst system into a six inch diameter stainless steel furnace which was itself heated by electric coils surrounding the furnace. Dry air was allowed to rise up through a centered metal grid plate at the rate of about 0.12 to about 0.20 linear feet per second to fluid out of the catalyst system. The catalyst system then was heated up to the desired temperature over a period of about 5 hours. It was held at that specified temperature for another 6 hours, and cooled down to room temperature and stored under dry nitrogen until tested. About 65 to 85 percent of the catalyst system weight charged was recovered, the lost weight being water and very fine material.

In some cases, catalyst systems were treated with carbon monoxide before being discharged from the reactor and stored under nitrogen. This was done in order to reduce at least some of the hexavalent chromium to a divalent state, which can increase 1-hexene incorporation efficiency, as described in *Polymer Engineering and Science* (SPE), Vol. 28, No. 22, pp. 1469–1472 (1988). This was accomplished by fluidizing the catalyst systems in carbon monoxide at about 350° C. (700° F.) for about 2 hours after the calcination step. The carbon monoxide can be used pure or diluted with up to 90 percent nitrogen. Bench scale activations usually used pure carbon monoxide for convenience, while the 23 gallon loop reactor used 10 percent carbon monoxide. After carbon monoxide treatment, catalyst systems were flushed clean with nitrogen for about 1 hour, cooled in nitrogen, and then stored. The color of reduced catalyst systems was usually blue or green, indicating that all, or substantially all, of the initial hexavalent chromium had been reduced to a lower oxidation state, generally the divalent state.

Analysis of the resultant polymers were conducted according to the following procedures.

Polymer density was determined in grams per cubic centimeter (g/cc) on a compression molded sample, cooled at about 15° C. (59° F.) per hour, and conditioned at room temperature for about 40 hours in accordance with ASTM D1505-68 and ASTM D1928, condition C.

High load melt index (HLMI) was determined in grams of polymer per 10 minutes (g/10 min) in accordance with ASTM D1238, Condition 190/2.16, at 190° C. (374° F.) with a 21,600 gram weight.

Melt Index (MI) was determined in grams of polymer per ten minutes in accordance with ASTM D1238, condition 190/2, at 190° C. (374° F.) with a 2,160 gram weight.

Typical molecular weights and molecular weight distributions were obtained using a Waters 150 CV size exclusion chromatograph (SEC) with trichlorobenzene (TCB) as the solvent, with a flow rate of 1 mL/minute at a temperature of 140° C. (284° F.). BHT (2,6-di-tert-butyl-4-methylphenol) at a concentration of 1.0 g/L was used as a stabilizer in the TCB. An injection volume of 220 L was used with a polymer concentration of 1.4 mg/L (at room temperature). Dissolution of the sample in stabilized TCB was carried out by heating at 160–170° C. (320–338° F.) for 4 hours with occasional, gentle agitation. The column was two Waters HMW-6E columns (7.8×300 mm) and were calibrated with a broad linear polyethylene standard (Phillips Marlex® BHB 5003) for which the molecular weight had been determined. As a measure of volatile oligomeric components, or smoke, the amount of material found in the range of molecular weights from 100 to 1000 were listed.

A "Quantachrome Autosorb-6 Nitrogen Pore Size Distribution Instrument" was used to determine the surface area and pore volume of the supports. This instrument was acquired from the Quantachrome Corporation, Syosset, N.Y.

Environmental Stress Crack Resistance (ESCR, hrs) was determined according to ASTM D1693, Condition A.

PENT environmental stress crack resistance values were obtained at 80° C. (176° F.) according to ASTM F1473 (1997).

SEC-FTIR Branch Determination as a function of the molecular weight distribution was obtained as follows. For molecular weight determinations, a Polymer Laboratories model, 210 GPC equipped with two Styragel HT 6E columns (Waters), was used. Resin samples were dissolved in trichlorobenzene (TCB) containing 0.034 weight percent butalatedhydroxytoluene (BHT) by heating the mixture for 1 hour at 155° C. (311° F.) in a Blue M air convection oven. Resin samples of about 1.8 mg/mL were chromatographed at 1 mL/min using TCB as the mobile, at a sample injection volume of 500 $\mu$L. The samples were introduced to a Perkin Elmer Model 2000 FTIR spectrophotometer equipped with a narrow band mercury cadmium telluride (MCT) detector via a heated transfer line and flow cell (KBr windows, 1 mm optical path, and about 70 $\mu$L cell volume). The temperatures of the transfer line and flow cell were kept at 143+/−1° C. (290+/−1° F.) and 140+/−1° C. (284+/−1° F.), respectively. Background spectra were obtained on the polymer free, solvent filled cell. All of the IR spectra were measured at 8 cm$^{-1}$ resolutions (16 scans).

Chromatograms were generated using the root mean square (rms) absorbance over the 3000-2700 cm$^{-1}$ spectral region and molecular weight calculations were made using a broad molecular weight PE standard. Spectra from individual time slices of the chromatogram were subsequently analyzed for co-monomer branch levels using the Chemometric techniques described below.

Narrow molecular weight distribution samples ($M_w/M^n$) of about 1.1 to about 1.3, solvent gradient fractions of ethylene 1-butene, ethylene 1-hexene, ethylene 1-octene copolymers, and polyethylene homopolymers were used in calibration and verification studies. Low molecular weight alkanes were also used. The total methyl content of these samples contained from about 1.4 to about 83.3 methyl groups per 1000 total carbon molecules. The methyl content of the samples was calculated from $M_n$ (number average molecular weight) or was measured using C-13 NMR spectroscopy. C-13 NMR spectra were obtained on 15 weight percent samples in TCB using a 500 MHZ Varian Unity Spectrometer at 125° C. (257° F.) as described in J. C. Randall and E. T. Hseish; *NMR and Macromolecules; Sequence, Dynamic, and Domain Structure*, ACS Symposium Series 247, J. C. Randall, Ed., American Chemical Society, Washington D.C., 1984. Methyl content per 1000 carbon molecules by NMR was obtained by multiplying the ratio of branching signals to total signal intensity by 1000.

A calibration curve was generated using Pirovette Chemometric software to correlate changes in the FTIR absorption spectra with calculated or NMR measured values for number of methyl groups per 1000 carbon molecules for the samples. The calibration results were obtained for the spectral region of 3000 cm$^{-1}$ and 2700 cm$^{-1}$ to avoid the solvent interference in quantitative results for prediction of the measured sample spectrum. Preprocessing of the spectral data included smoothing of 9 data points, baseline correction, and normalization. Further preprocessing of the spectral data entailed taking the first derivative of the spectra and mean centering all the data. A four component calibration model was calculated and optimized using the process of cross validation (RSQ=0.999, SEV=0.7). The calibration model was verified using 13 additional samples. The predicted versus actual values for the validation data showed excellent correlation (RSQ=0.987) and exhibited a root mean square error of prediction equal to +/−0.4 methyl groups per 1000 total carbon molecules.

Short chain branching levels were calculated by subtracting out methyl chain end contributions. The amount of methyl chain ends were calculated using the equation $Me_{ce}=C(2-V_{ce})/M$, where $Me_{ce}$ is the number of methyl chain ends per 1000 total carbon molecules, C is a constant equal to 14000, $V_{ce}$ is the number of vinyl terminated chain ends (1 for chromium catalyzed resins), and M is the molecular weight calculated for a particular slice of the molecular weight distribution.

This example illustrates the traditional difficulties experienced in the art in using chromium/aluminophosphate catalyst systems. Table 6 compares the activity response of the chromium/aluminophosphate catalyst systems when the phosphorus to aluminum (P/Al) mole ratio and activation temperature were varied. The chromium/aluminophosphate catalyst systems were obtained from a bench reactor operating at 95° C. (203° F.) with 4 ppm triethylboron (TEB) and 550 psig ethylene.

TABLE 6

Activity response of various chromium/aluminophosphate catalyst systems (g pol/g cat/hr) to various P/Al molar ratios and activation temperatures

| P/Al molar ratio | Catalyst System Activity at Different Activation Temperatures | | |
|---|---|---|---|
| | 300° C. | 500° C. | 700° C. |
| 0.0 | 0 | 555 | 1340 |
| 0.2 | 1085 | 1685 | 2295 |
| 0.4 | 2000 | 4790 | 5400 |
| 0.6 | 1970 | 6395 | 6300 |
| 0.8 | 2910 | 4444 | 4235 |
| 0.95 | 2500 | 3565 | 3770 |
| 1.0 | 0 | 0 | 700 |

As shown in Table 6, the highest activity catalyst systems were achieved with both high P/Al molar ratios and high activation temperatures. Catalyst systems run at low P/Al molar ratios and low activation temperatures generally yielded poor or unacceptable activity. However, it is at these low P/Al molar ratios and low activation temperatures where the broadest molecular weight distributions (MWD) are found and thus more desirable polymer properties.

EXAMPLE 21

This example compares the environmental stress crack resistance (ESCR) values of polymers obtained from the loop reactor using chromium/aluminophosphate catalyst systems of varying P/Al molar ratios. The polymers (homopolymers) of this example were obtained from a 23 gallon loop reactor operating between about 93° C. (200° F.) to about 99° C. (210° F.) with 0.5 to 1 ppm triethylboron. The catalyst systems were activated at 600° C. (1112° F.) and the polymers obtained had melt index (MI) values of 0.15 to 0.35 g/10 minutes. As shown in Table 7, the highest ESCR values are obtained at low P/Al molar ratios.

TABLE 7

Environmental Stress Crack Resistance (ESCR) values of polymers varying P/Al molar ratios

| P/Al | | | | | | | | | |
|---|---|---|---|---|---|---|---|---|---|
| 0 | 0.2 | 0.3 | 0.37 | 0.4 | 0.5 | 0.55 | 0.6 | 0.8 | 0.9 |
| ESCR, (hrs) | | | | | | | | | |
| >100 | >100 | 525 | 300 | 240 | 150 | 95 | 100 | 24 | 0 |

EXAMPLE 22

This example illustrates another problem associated with chromium/aluminophosphate catalyst systems and the response to 1-hexene or other comonomers. Usually, commercial chromium catalyst systems (chromium/silica) incorporate 1-hexene well to easily produce ethylene/1-hexene copolymers. The addition of 1-hexene in an amount equal to about 4 percent of the liquid diluent is usually sufficient to cover the entire copolymer range, from densities of 0.970 g/cc to densities as low as 0.920 g/cc for some catalyst systems. As 1-hexene is incorporated, the melt index potential of the catalyst system remains essentially unchanged due to the counter-balancing effect of an increase in melt index when 1-hexene is added and a decrease in melt index when the reactor temperature is lowered to prevent swelling.

However, chromium/aluminophosphate catalyst systems respond in a completely different manner. Even though 1-hexene can be added in large amounts, 1-hexene can be incorporated into the polymer only very sparingly. As a result, 1-hexene can have a poisoning effect on chromium/aluminophosphate catalyst systems which can decrease catalyst system activity and cause the melt index to rise excessively, often out of control. These effects are demonstrated in Table 8, below, and FIGS. 4 and 5. This data was obtained from the 23 gallon loop reactor under the conditions described above.

TABLE 8

Effect of 1-hexene on chromium/aluminophosphate catalyst systems compared to chromium/silica catalyst systems

| Catalyst System | % Diluent of 1-hexene | Density of Polymer, g/cc | % Relative Activity of Catalyst System |
|---|---|---|---|
| Chromium/Aluminophosphate | | | |
| P/Al = 0.8 | 0.00 | 0.9369 | 100 |
| P/Al = 0.8 | 0.90 | 0.9595 | 59 |
| P/Al = 0.8 | 1.30 | 0.9595 | 55 |
| P/Al = 0.8 | 1.40 | 0.9578 | 52 |
| P/Al = 0.8 | 0.00 | 0.9672 | 100 |
| P/Al = 0.8 | 1.30 | 0.9621 | 52 |
| P/Al = 0.9 | 0.00 | 0.9650 | 100 |
| P/Al = 0.9 | 2.00 | 0.9640 | 41 |
| P/Al = 0.9 | 3.90 | 0.9605 | 36 |
| P/Al = 0.3 | 0.00 | 0.9597 | 100 |
| P/Al = 0.3 | 1.80 | 0.9567 | 36 |
| P/Al = 0.3 | 3.65 | 0.9538 | 42 |
| P/Al = 0.4 | 0.00 | 0.9610 | 100 |
| P/Al = 0.4 | 4.00 | 0.9544 | 49 |
| Chromium/Silica | | | |
| | 0.00 | 0.965 | 100 |
| | 1.00 | 0.952 | 104 |
| | 2.00 | 0.943 | 100 |
| | 3.00 | 0.938 | 96 |
| | 4.00 | 0.934 | 106 |

Figure 4:
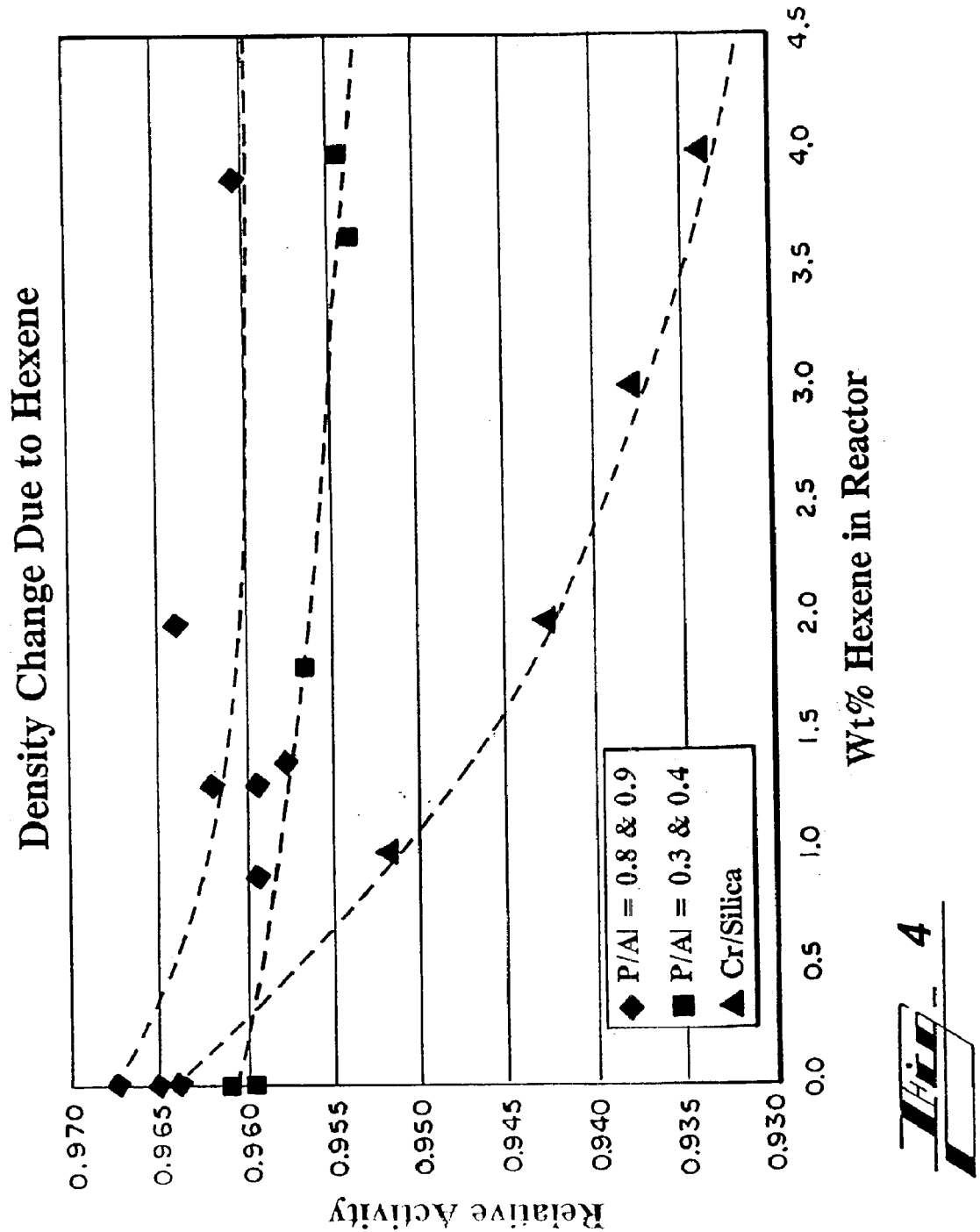
FIG. 4 is a graph of polymer density (g/cc) vs: weight percent 1-hexene in the reactor.
Figure 5:
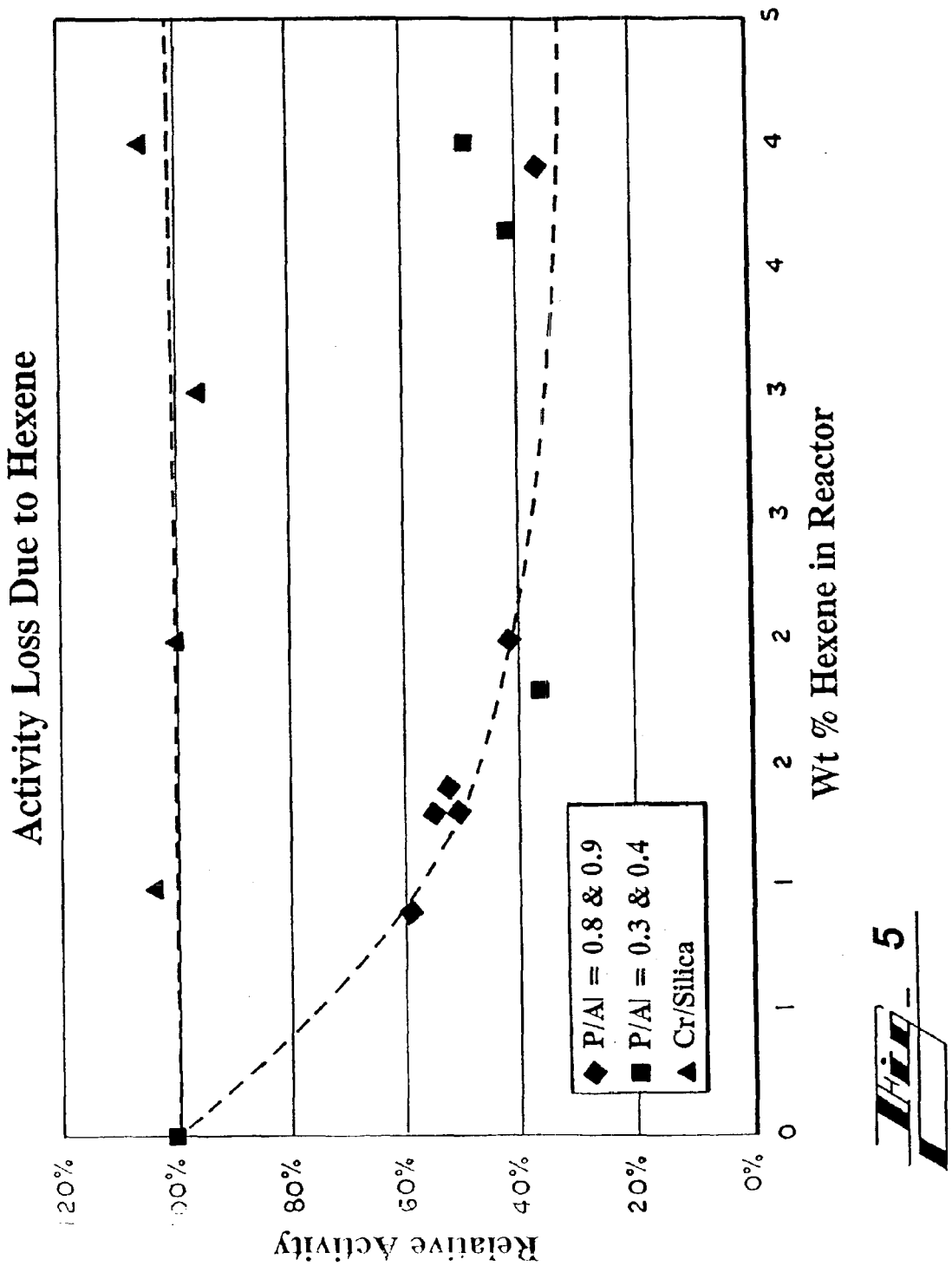
FIG. 5 is a graph of the relative activity of the catalyst system (g/g/h) vs. weight percent 1-hexene in the reactor.

As Table 8, and FIGS. 4 and 5 illustrate, the decrease in density of the chromium/aluminophosphate catalyst systems is insignificant as 1-hexene is added, which is illustrative of the poor catalyst system activity. Even at large amounts of 1-hexene, i.e., up to 4 percent of the diluent, the density drop is still minimal. As Table 8 and FIGS. 4 and 5 represent, producing copolymers using typical chromium/aluminophosphate catalyst systems is problematic at best and certainly cannot produce copolymers with densities of about 0.955 g/cc and below.

INVENTIVE EXAMPLES A–M

The following examples illustrate the procedures of this invention and its effectiveness on the polymerization process and the resultant polymer.

Examples A–M demonstrate the effectiveness of the procedures of this invention. These examples, listed in Table 9, were prepared in the 23 gallon loop reactor described above using chromium/aluminophosphate catalyst systems (designated as $AlPO_4$ in the table) having a P/Al molar ratio of 0.2, which were further impregnated with 2% and 2.64% fluoride, as indicated (present in an effective amount of ammonium bifluoride). The catalyst systems were activated at a temperature of 1000° F. (538° C.) and 1100° F. (594° C.) as indicated, and run with 0 to about 2 ppm TEB cocatalyst, as indicated in the table.

As shown in Table 9, examples A–M have HLMI values at desired processing ranges of 5 to 10 g/10 minutes, densities ranging from 0.945–0.951 g/cc, and PENT ESCR values ranging from greater than 1950 hours to greater than 2091 hours. In all cases the PENT ESCR tests were stopped as the time approached 2000 hours, not because of sample failures, but in order to free the testing station for other work. The high PENT ESCR values associated with examples A–M was accomplished without excessively low HLMI values and at rather high densities, in one case at a density of 0.9516 g/cc. In addition, as shown in Table 9, examples H–M have weight average molecular weight distributions ($M_w/M_n$) ranging from 98 to 108, well above the comparative examples.

Carbon monoxide reduction can optionally be used in accordance with the procedures of this invention to improve 1-hexene incorporation. It can be seen in examples F and G the effects that carbon monoxide reduction can have on the resultant polymer. Although HLMI values of examples F and G are below the desired range, as shown in Table 9, copolymers were produced in accordance with this invention, even in the absence of carbon monoxide reduction.

COMPARATIVE EXAMPLES C10–C18

Also shown in Table 9 are similar pipe resins made under similar conditions, but using conventional catalyst systems. Notice that example C10, made from a Magnapore chromium/silica-titania catalyst system yielded a density much lower than desired and the PENT ESCR value was excessively low compared to the inventive examples described above. Although example C10 did not employ a triethylboron cocatalyst, known to broaden the molecular weight distribution of chromium/silica-titania catalyst systems, examples C11–C16 did employ a triethylboron cocatalyst. However, even with the addition TEB, it can be seen from Table 9 that the PENT ESCR value did improve, but the results were still inferior compared to the inventive examples. Also, in examples C12, and C14–C16 it can be seen the benefits that can be gained by using a lower activation temperature, in this case 1000° F. instead of 1200° F. Although examples C12, C14–C16 yielded high densities, the PENT ESCR values were poor in comparison to the inventive examples.

Also, example C17 used a triethylboron cocatalyst with a lower porosity chromium/silica-titania catalyst system, but again the PENT ESCR value was very low, even at the excessively low HLMI of 3.9 g/10 minutes. Even when a chromium/silica catalyst system was used instead of chromium/silica-titania catalyst system as shown in example 18, the benefits were minimal. Although the PENT ESCR value for the chromium/silica catalyst system was greater than the other chromium/silica-titania catalyst systems, it was still very low compared to the inventive examples.

COMPARATIVE EXAMPLES C19–C22

The low PENT ESCR values in examples C19–C22 show that not any chromium/aluminophosphate catalyst system can be used, only those described in accordance with this

TABLE 9

PENT ESCR values for selected pipe resins

| Run | Catalyst System | Fluoride Level (wt % F.) | Activation Temperature (° F.) | CO reduction (700° F.) | Cocatalyst (Conc ppm) | HLMI (g/10 min) | Density (g/cc) | ESCR (2.54 MPa) | $M_w$ (×1000) | $M_n$ (×1000) | $M_w/M_n$ |
|---|---|---|---|---|---|---|---|---|---|---|---|
| A | $Cr/ALPO_4$ = 0.2 | 2% | 1000° F. | No | TEB (2.05) | 7.53 | 0.9505 | >1950 | — | — | — |
| B | $Cr/ALPO_4$ = 0.2 | 2% | 1000° F. | No | TEB (1.32) | 7.77 | 0.9491 | >1957 | — | — | — |
| C | $Cr/ALPO_4$ = 0.2 | 2% | 1000° F. | No | TEB (1.16) | 4.14 | 0.9484 | >1966 | — | — | — |
| D | $Cr/ALPO_4$ = 0.2 | 2% | 1100° F. | No | TEB (1.5) | 10.82 | 0.9496 | >2035 | — | — | — |
| E | $Cr/ALPO_4$ = 0.2 | 2% | 1100° F. | No | TEB (1.77) | 9.13 | 0.9455 | >2091 | — | — | — |
| F | $Cr/ALPO_4$ = 0.2 | 2% | 1100° F. | Yes | — | 4.37 | 0.9481 | >1562 | — | — | — |
| G | $Cr/ALPO_4$ = 0.2 | 2% | 1100° F. | Yes | — | 2.68 | 0.9456 | >2006 | — | — | — |
| H | $Cr/ALPO_4$ = 0.2 | 2.64% | 1100° F. | No | TEB (1) | 4.8 | 0.9494 | >2000 | 718 | 6900 | 104 |
| I | $Cr/ALPO_4$ = 0.2 | 2.64% | 1100° F. | No | TEB (1) | 6.0 | 0.9496 | >2000 | 679 | 6900 | 98 |
| J | $Cr/ALPO_4$ = 0.2 | 2.64% | 1100° F. | No | TEB (1) | 7.9 | 0.9512 | >2000 | 714 | 6800 | 105 |
| K | $Cr/ALPO_4$ = 0.2 | 2.64% | 1100° F. | No | TEB (1) | 5.3 | 0.9492 | >2000 | 740 | 6900 | 107 |
| L | $Cr/ALPO_4$ = 0.2 | 2.64% | 1100° F. | No | TEB (1) | 6.2 | 0.9507 | >2000 | 702 | 6500 | 108 |
| M | $Cr/ALPO_4$ = 0.2 | 2.64% | 1100° F. | No | TEB (1) | 7.5 | 0.9516 | >2000 | 724 | 6900 | 105 |
| C10 | 963 Magnapore | — | 1200° F. | No | — | 10.31 | 0.9443 | 64 | 173.45 | 17.85 | 9.72 |
| C11 | 964 Magnapore | — | 1200° F. | No | TEB (2.05) | 11.28 | 0.9457 | 194 | 234.95 | 10.25 | 22.92 |
| C12 | 963 Magnapore | — | 1000° F. | Yes | TEB (3.12) | 5.21 | 0.9495 | 113 | | | |
| C13 | 963 Magnapore | — | 1200° F. | Yes | TEB (0.8) | 10.52 | 0.9436 | 51 | | | |
| C14 | 963 Magnapore | — | 1000° F. | No | TEB (6) | 8.4 | 0.9511 | 250 | 554 | 8200 | 68 |
| C15 | 963 Magnapore | — | 1000° F. | No | TEB (6) | 4.7 | 0.9504 | 374 | 564 | 8200 | 69 |
| C16 | 963 Magnapore | — | 1000° F. | No | TEB (6) | 4.3 | 0.9507 | 281 | 571 | 7700 | 74 |
| C17 | 965 Sylopore | — | 1100° F. | No | TEB (1.75) | 3.91 | 0.9486 | 52 | | | |
| C18 | 969 MS | — | 1100° F. | No | TEB (2.15) | 12.37 | 0.9435 | 356 | 254.94 | 12.81 | 19.9 |
| C19 | $Cr/AlPO_4$ = 0.3 | — | 1100° F. | Yes | TEB (1) | 21.44 | 0.9463 | 17 | 257.14 | 8.99 | 28.59 |
| C20 | $Cr/AlPO_4$ = 0.3 | — | 1100° F. | Yes | TEB (1) | 15.54 | 0.9507 | 37 | | | |
| C21 | $Cr/AlPO_4$ = 0.6 | — | 1100° F. | Yes | — | 13.25 | 0.9432 | 143 | 259.02 | 11.03 | 23.48 |
| C22 | $Cr/AlPO_4$ = 0.6 | — | 1100° F. | Yes | — | 12.57 | 0.9440 | 166 | 170.6 | 9.5 | 17.95 |

*Weight average molecular weight ($M_w$), number average molecular weight ($M_n$), and polydispersity ($M_w/M_n$) was determined by SEC method (not coupled with FTIR).

invention. In these examples, chromium/aluminophosphate catalyst systems were made as described above, and were run according to the same conditions used in inventive examples A–M, but the P/Al molar ratio was varied. In examples C19 and C20, the P/Al molar ratio was raised to 0.3, only slightly above the 0.2 molar ratio used in examples A–M. As shown in examples C21 and C22, the P/Al molar ratio was increased to 0.6, but again this resulted in low PENT ESCR values, even at the unacceptable low density obtained. As the data in Table 9 demonstrate, the PENT ESCR value suffered considerably when the P/Al molar ratio was increased much above 0.2. However, lower levels of P/Al molar ratios also can be unacceptable, since the catalyst system activity decreases substantially.

EXAMPLE 23

This example illustrates the effect of fluoride on the catalyst systems used in accordance with this invention. It is generally known that fluoride improves activity for catalyst systems containing alumina, but its effects on density have not been previously known. In this example, chromium/aluminophosphate catalyst systems were made as described above, but impregnated with different amounts of fluoride. Two P/Al molar ratios were chosen, one high (P/Al=0.6), and one low (P/Al=0.2) to illustrate fluoriding effects on density. Catalyst systems were activated at 1200° F. (649° C.) and polymers were produced in the 23 gallon loop reactor as described above using about 1 ppm triethylboron (TEB) cocatalyst. The results are described in Table 10 below.

TABLE 10

Effect of fluoride on polymer as indicated by density of polymer at P/Al molar ratios of 0.2 and 0.6

| | Density of Polymer | |
|---|---|---|
| Percent Fluoride added | P/Al = 0.2 | P/Al = 0.6 |
| 0.00% | 0.9582 | 0.9647 |
| 0.34% | 0.9573 | n/a |
| 0.67% | 0.9565 | 0.9625 |
| 1.34% | 0.9547 | 0.9605 |
| 2.01% | 0.9538 | 0.9600 |
| 2.68% | 0.9539 | n/a |

As the data in Table 10 demonstrate, as fluoride was added to the catalyst systems, it was observed that the natural density of the polymers decreased. As shown in Table 10, most of the effect on density occurred by about 2 percent $NH_4HF_2$ addition (1.34% F), but small decreases in density were visible at increased fluoride percentages, both at P/Al molar ratios of 0.2 and 0.6. Natural lowering of density is very helpful for Chromium/aluminophosphate catalyst systems because, as stated above, chromium aluminophosphate catalyst systems have a tendency to be poisoned by 1-hexene comonomer which would ordinarily be used to lower density.

However, as shown in Table 11 below, adding too much fluoride can be detrimental.

TABLE 11

Effect of Fluoride on catalyst system activity

| % F | Grams of Catalyst system charged (g cat) | Grams of polymer obtained (g pol) | Time (min) | Activity (g pol/g cat/h)) |
|---|---|---|---|---|
| 0.00% | 0.06 | 138.3 | 60.0 | 2305 |
| 2.68% | 0.0487 | 132.5 | 53.3 | 3063 |
| 4.00% | 0.0376 | 73.0 | 61.2 | 1903 |
| 4.00% | 0.0950 | 213.0 | 62.5 | 2152 |
| 4.00% | 0.0686 | 132 | 60.5 | 1908 |

The data in Table 11 were obtained from polymers made using the bench reactor with 8 ppm TEB cocatalyst, under conditions described above. Chromium/aluminophosphate catalyst systems were made as described above at a P/Al molar ratio of 0.2 and at an activation temperature of 1100° F. (593° C.), except that the level of ammonium bifluoride was varied. As the data in Table 11 indicate, although initially fluoride enhanced the catalyst system activity, 6 percent $NH_4HF_2$ (4% F) appeared to impair catalyst system activity. Although the precise optimum level of fluoride will vary somewhat with activation temperature, surface area, and other factors, etc., it would appear that the optimum level would be in the general range of about 2 to about 4 percent $NH_4HF_2$ (1.34–2.68% F) or the equivalent thereto of some other fluoride source.

EXAMPLE 24

This example illustrates the preferred use of cocatalyst(s) in the present invention. Since low P/Al molar ratios and low activation temperatures are preferred in chromium/aluminophosphate catalyst systems for improved polymer properties, the catalyst systems naturally exhibit low activity, especially if 1-hexene is added to make copolymers. Thus, the use of cocatalyst(s) to improve catalyst system activity is particularly effective for chromium/aluminophosphate catalyst systems. Preferably, in accordance with the procedures of this invention, a cocatalyst(s) is present in the reactor in a concentration in the range of from about 0.3 to 10 ppm. In this example, aluminophosphate catalyst systems were prepared according to the procedure described above at a temperature of 1200° F. (649° C.) and used with various cocatalysts as indicated in Table 12 below. The cocatalyst effect on catalyst system activity is noted.

TABLE 12

Cocatalyst Effect

| Cocatalyst | Concentration (ppm) | Activity (g pol/g cat/h) |
|---|---|---|
| None | | 1725 |
| BEt3 | 4 | 3920 |
| BEt3 | 8 | 4400 |
| BEt3 | 16 | 1930 |
| BBu3 | 4 | 5590 |
| BBu3 | 8 | 6264 |
| BBu3 | 16 | 5735 |
| BBu3 | 24 | 1055 |
| BPh3 | 8 | 1290 |
| AlEt3 | 4 | 1885 |
| AlEt3 | 8 | 1720 |
| AlEt3 + BEt3 | 4 & 4 | 6855 |
| ZnEt2 | 8 | 1945 |
| AlEt2Cl | 4 | 1790 |
| AlEt2Cl | 8 | 1450 |

TABLE 12-continued

Cocatalyst Effect

| Cocatalyst | Concentration (ppm) | Activity (g pol/g cat/h) |
|---|---|---|
| AlEt2Cl | 8 | 1065 |
| MgBu2 | 8 | 1670 |
| LiBu | 4 | 1540 |
| LiBu | 8 | 1280 |
| AlEt2Oet | 8 | 1210 |
| BEtCl2 | 8 | 505 |
| NaBPh4 | 4 | 850 |
| NaBPh4 | 8 | 2130 |
| NaBPh4 | 32 | 260 |
| LiBBu4 | 4 | 1957 |
| SbBu3 | 16 | 685 |
| SbPh3 | 16 | 1730 |
| Sn2Bu6 | 15 | 2090 |
| Et3SiOAlEt2 | 8 | 3125 |
| GeBu4 | 16 | 0 |
| Ph3SiOBEt2 | 16 | 0 |

Et = Ethyl;
Bu = Butyl;
Ph = Phenyl

As the data in Table 12 demonstrate, trialkylboron compounds as cocatalyst was effective in its effect on catalyst system activity as well as trialkylsiloxyaluminum compounds. Combinations of triethylboron and triethylaluminum compounds were also effective on catalyst system activity. In some cases, the combination of triethylboron and triethylaluminum compounds as cocatalyst(s) exhibited higher catalyst system activity than either compound alone.

EXAMPLE 25

Figure 6:
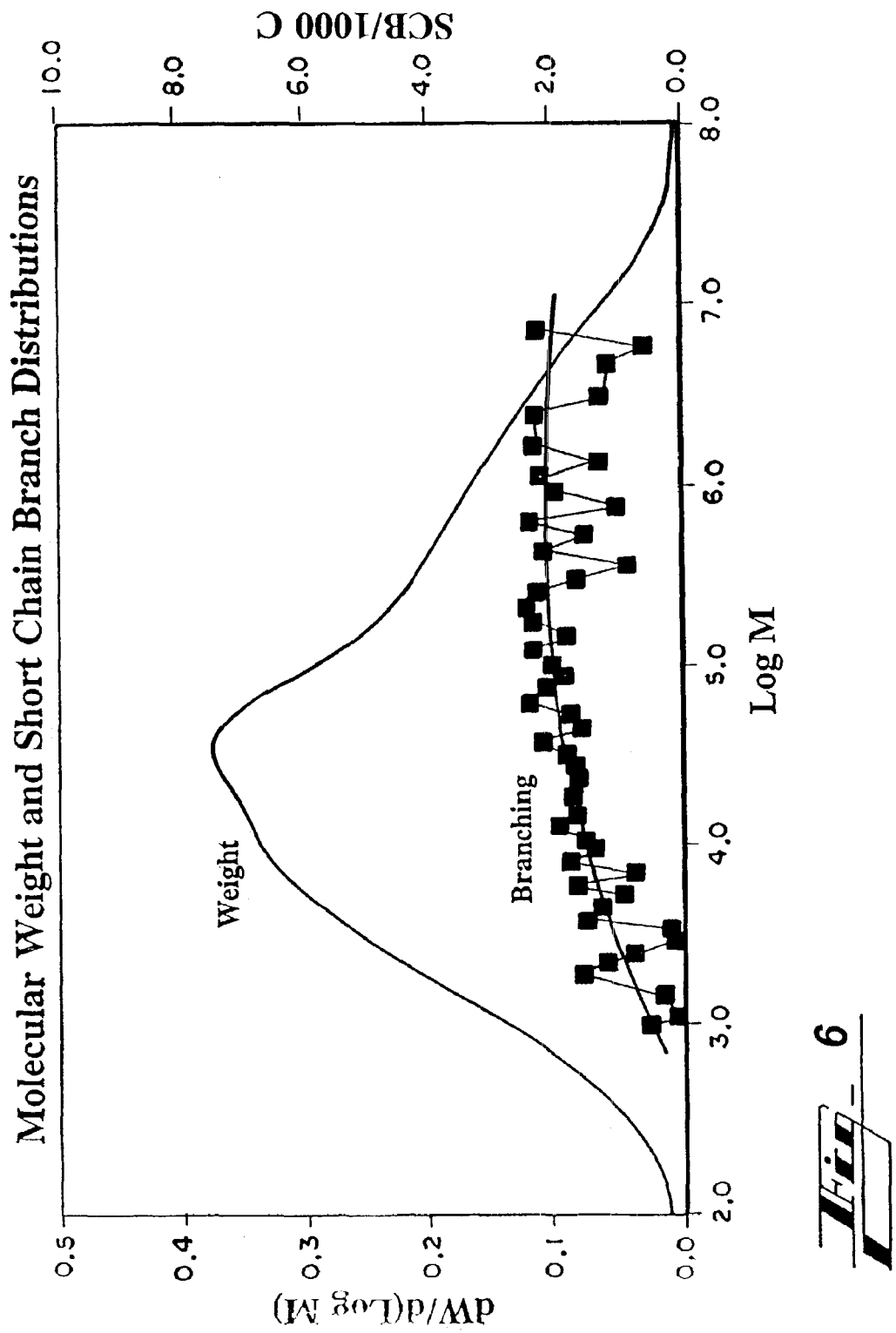
FIG. 6 is a graph of short chain branch distributions (SCB/1000 total carbons) of a polymer given in Example VII vs. molecular weight (Log M).

This example illustrates the molecular weight distribution of polymers produced in accordance with this invention. To obtain this distribution, a chromium/aluminophosphate catalyst system with a P/Al molar ratio of 0.2 and 4 weight percent ammonium bifluoride was prepared by the method described above and activated at 1100° F. (649° C.). Triethylboron was used as cocatalyst at 2.1 ppm. The resultant polymer was produced in the 23 gallon loop reactor as described above and had a HLMI of 6.75 g/10 minutes and a density of 0.9485 g/cc. A branch profile analysis of this polymer displaying the branching and molecular weight distribution is shown in FIG. 6.

Ordinarily, chromium based catalyst systems tend to incorporate comonomers into the low molecular weight portion of the distribution. This can be undesirable since desirable properties can be found in distributions containing branching in the largest chains, since these can serve as tie molecules between crystallines. FIG. 6, as well as FIGS. 1 and 2, demonstrates that the catalyst systems of this invention produce polymers where the branching tends to be weighted toward the high molecular weight end, which is where the superior PENT ESCR values can be found. Also, FIG. 6, as well as FIGS. 1 and 2, demonstrates the extremely broad molecular weight distribution of polymers produced in accordance with this invention. The weight average molecular weight ($M_w$) was 759,000 while the number average molecular weight ($M_n$) was 4310, giving a polydispersity breadth ($M_w/M_n$) of 176.3, as determined by SEC-FTIR Branch Determination method.

Although the invention has been described in detail for the purpose of illustration, it is understood that such detail is solely for that purpose, and variations can be made therein by those skilled in the art without departing form the spirit and scope of the invention which is defined by the following claims.

What is claimed is:

1. A composition comprising a PE-100 copolymer of ethylene and 1-hexene having an average molecular weight greater than about 300,000 g/mol, a substantially constant branch distribution profile at molecular weights greater than about $1 \times 10^4$, and a HLMI of less than about 3.5.

2. The composition according to claim 1, wherein the average molecular weight is greater than at least about 350,000 g/mol.

3. The composition according to claim 1, wherein the average molecular weight is greater than at least about 400,000 g/mol.

4. The composition according to claim 1, wherein the average molecular weight is greater than at least about 450,000 g/mol.

5. The composition according to claim 1, wherein the branch distribution profile is substantially constant between molecular weights of about $1 \times 10^4$ to about $1 \times 10^7$.

6. A PE-100 pipe comprising a PE-100 copolymer of ethylene and 1-hexene having an average molecular weight greater than about 300,000 g/mol and a substantially constant branch distribution profile at molecular weights greater than about $1 \times 10^4$.

7. A method of making a PE-100 pipe comprising extruding a composition in a molten state through a die to form the PE-100 pipe and cooling the pipe, the composition comprising a PE-100 copolymer of ethylene and 1-hexene having an average molecular weight greater than about 300,000 g/mol and a substantially constant branch distribution profile at molecular weights greater than about $1 \times 10^4$.

8. A composition comprising a PE-100 copolymer of ethylene and 1-hexene having an Eta(0) greater than about $1 \times 10^6$ pa-sec, a substantially constant branch distribution profile at molecular weights greater than about $1 \times 10^4$, and a HLMI of less than about 3.5.

9. The composition according to claim 8, wherein the Eta(0) greater than about $5 \times 10^6$ pa-sec.

10. The composition according to claim 8, wherein the Eta(0) greater than about $1 \times 10^7$ pa-sec.

11. The composition according to claim 8, wherein the Eta(0) greater than about $2 \times 10^7$ pa-sec.

12. The composition according to claim 8, wherein the branch distribution profile is substantially constant between molecular weights of about $1 \times 10^4$ to about $1 \times 10^7$.

13. A PE-100 pipe comprising a PE-100 copolymer of ethylene and 1-hexene having an Eta(0) greater than about $1 \times 10^6$ pa-sec and a substantially constant branch distribution profile at molecular weights greater than about $1 \times 10^4$.

14. A method of making a PE-100 pipe comprising extruding a composition in a molten state through a die to form the PE-100 pipe and cooling the pipe, the composition comprising a PE-100 copolymer of ethylene and 1-hexene having an Eta(0) greater than about $1 \times 10^6$ pa-sec and a substantially constant branch distribution profile at molecular weights greater than about $1 \times 10^4$.

15. A composition comprising a PE-100 copolymer of ethylene and 1-hexene having an Eta(0) less than about $5 \times 10^7$ pa-sec, a substantially constant branch distribution profile at molecular weights greater than about $1 \times 10^4$, and a HLMI of less than about 3.5.

16. The composition according to claim 15, wherein the Eta(0) greater than about $2.5 \times 10^7$ pa-sec.

17. The composition according to claim 15, wherein the Eta(0) greater than about $1.5 \times 10^7$ pa-sec.

18. The composition according to claim 15, wherein the Eta(0) greater than about $1 \times 10^7$ pa-sec.

19. The composition according to claim 15, wherein the branch distribution profile is substantially constant between molecular weights of about $1 \times 10^4$ to about $1 \times 10^7$.

20. A PE-100 pipe comprising a PE-100 copolymer of ethylene and 1-hexene having an Eta(0) less than about $5 \times 10^7$ pa-sec and a substantially constant branch distribution profile at molecular weights greater than about $1 \times 10^4$.

21. A method of making a PE-100 pipe comprising extruding a composition in a molten state through a die to form the PE-100 pipe and cooling the pipe, the composition comprising a PE-100 copolymer of ethylene end 1-hexene having an Eta(0) less than about $5 \times 10^7$ pa-sec and a substantially constant branch distribution profile at molecular weights greater than about $1 \times 10^4$.

22. The composition of claim 1, the copolymer having an average molecular weight greater than about 300,000 g/mol and less than about 1,000,000 g/mol.

* * * * *